US012796720B2

(12) United States Patent
Zhang et al.

(10) Patent No.: US 12,796,720 B2
(45) Date of Patent: Nov. 17, 2026

(54) EDIBLE MYCOPROTEIN PELLETS

(71) Applicant: THE REGENTS OF THE UNIVERSITY OF CALIFORNIA, Oakland, CA (US)

(72) Inventors: Ruihong Zhang, El Macero, CA (US); Lin Cao, Yangzhong (CN); Tyler Barzee, Lexington, KY (US); Zhongli Pan, El Macero, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 236 days.

(21) Appl. No.: 18/262,036

(22) PCT Filed: Jan. 19, 2022

(86) PCT No.: PCT/US2022/013002
§ 371 (c)(1),
(2) Date: Jul. 19, 2023

(87) PCT Pub. No.: WO2022/159509
PCT Pub. Date: Jul. 28, 2022

(65) Prior Publication Data

US 2024/0090555 A1 Mar. 21, 2024

Related U.S. Application Data

(60) Provisional application No. 63/139,179, filed on Jan. 19, 2021.

(51) Int. Cl.

| | |
|---|---|
| *A23L 31/00* | (2016.01) |
| *A23L 2/52* | (2006.01) |
| *A23P 20/10* | (2016.01) |

(52) U.S. Cl.
CPC ................ *A23L 31/00* (2016.08); *A23L 2/52* (2013.01); *A23P 20/105* (2016.08)

(58) Field of Classification Search
CPC ............................... A23L 31/00; A23P 20/105
See application file for complete search history.

(56) References Cited

U.S. PATENT DOCUMENTS

| | | | |
|---|---|---|---|
| 4,321,327 | A | 3/1982 | Chen et al. |
| 2015/0004670 | A1 | 1/2015 | Mueller et al. |

(Continued)

FOREIGN PATENT DOCUMENTS

| | | |
|---|---|---|
| CN | 108902295 A | 11/2018 |
| WO | WO 2020/227617 | 11/2020 |

OTHER PUBLICATIONS

PCT International Search Report dated Mar. 31, 2022 for corresponding PCT Application No. PCT/US22/13002.

(Continued)

*Primary Examiner* — Elizabeth Gwartney
(74) *Attorney, Agent, or Firm* — Morgan, Lewis & Bockius LLP

(57) ABSTRACT

Disclosed herein are novel edible fungal products with various colors, flavors, shapes, sizes, densities, and biological activities, and methods of producing these products. An exemplary process uses fungal biomass deactivation and pellet-coating steps which allow control over the texture, flavor, color, and nutrient characteristics of the resulting product. The coating and deactivation process can be utilized in concert with the other methods of this invention to create a wide array of products with novel flavor, texture, and nutrient characteristics, depending on the intended application.

20 Claims, 28 Drawing Sheets

(56) References Cited

U.S. PATENT DOCUMENTS

2019/0059431 A1 * 2/2019 Kozubal ................ A23J 3/227
2019/0373934 A1 12/2019 Huggins et al.

OTHER PUBLICATIONS

Nair et al., "Mycelial pellet formation by edible ascomycete filamentous fungi, Neurospora intermedia," AMB Express, Apr. 22, 2016, vol. 6, !ssl!e. 31, pp. 1-10.
Pitaktamrong et al., Development of Arbuscular Mycorrhizal Fungi Organic Fertilizer Pellets 1-6, 36-43 Encapsulated with Alginate Film, Engineering Journal, Dec. 4, 2018, vol. 22, Iss. 6, pp. 65-79.
Gracia, M. I., et al. "Alpha-amylase supplementation of broiler diets based on corn." Poultry Science 82.3 (2003): 436-442.
Moore and Chiu. "Fungal products as food." Bio-exploitation of filamentous fungi. Fungal Diversity Press, Hong Kong (2001): 223-251.
Saleh, Ahmed A., et al. "Aspergillus awamori feeding modifies lipid metabolism in rats." BioMed Research International (2013).
Saleh, Ahmed A., et al. "Effects of feeding Aspergillus awamori and Aspergillus niger on growth performance and meat quality in broiler chickens." The Journal of Poultry Science 48.3 (2011): 201-206.
Sfahlan, A. J. et al., Antioxidants and antiradicals in almond hull and shell (*Amygdalus communis* L.) as a function of genotype. Food Chemistry 115 (2): 529-533 (2009).
Winther et al., "Bioactive ingredients of rose hips (*Rosa canina* L) with special reference to antioxidative and anti-inflammatory properties: in vitro studies." Botanics: Targets and Therapy (2015).

* cited by examiner

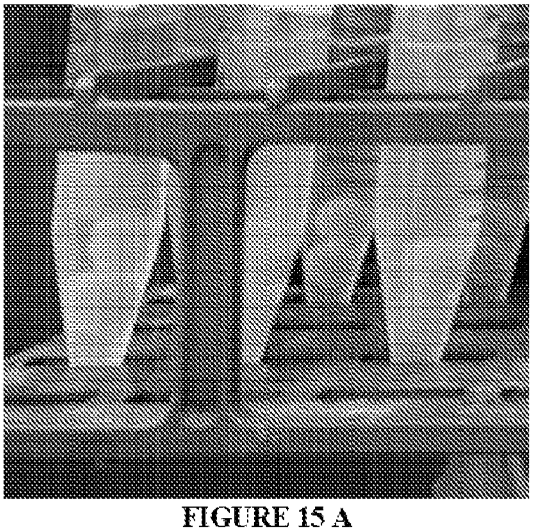
FIGURE 15 A
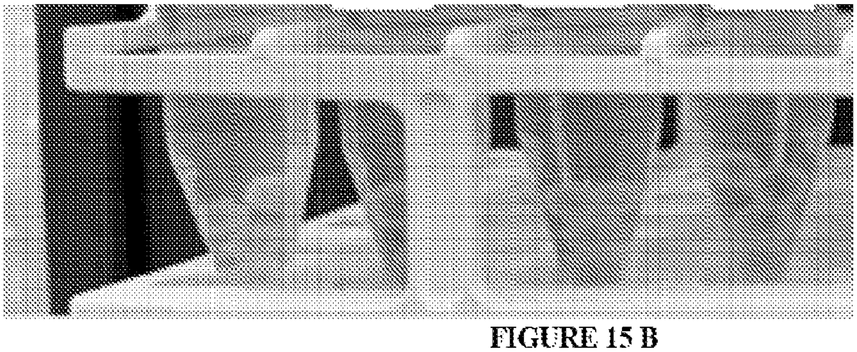
FIGURE 15 B
FIGURE 15

EDIBLE MYCOPROTEIN PELLETS

CROSS REFERENCE TO RELATED APPLICATIONS

This application claims priority to U.S. Provisional Patent Application No. 63/139,179, filed Jan. 19, 2021, the contents of which are hereby incorporated by reference, in their entireties, for all purposes.

BACKGROUND OF THE INVENTION

*Aspergillus awamori* (*A. awamori*) is a filamentous fungi that has long been used in the food processing industry for the production of citric acid. The products of *A. awamori* are given Generally Recognized as Safe status from Food and Drug Administration (FDA) (Saleh et al., 2011). *A. awamori* has been identified as a natural feed additive in animal diets, because it can improve the growth performance, digestibility and protein metabolism (Saleh et al., 2014). These benefits could be attributed to that fact that *A. awamori* produces various enzymes like protease and amylase during fermentation and enhance digestion of carbohydrates and proteins (Gracia et al., 2003). The biomass of *A. awamori* has been shown to be good feed for animals because they have a fairly high content of protein and dietary fiber, and is free of cholesterol (Moore and Chiu, 2001).

Cultures of the fungus *Aspergillus awamori* is a non-pathogenic fungus. Cultures of *A. awamori* are used in fermentation to make foodstuffs. The use of *A. awamori* in fermentation is most prevalent in East Asia, where it is used in the production of beverages such as *awamori*, and shochu. The fungus is also used to produce citric acid and is known to convert starch to sugar. Hong S-B, Lee M, Kim D-H, Varga J, Frisvad J C, Perrone G, et al. (2013). PLoS ONE 8(5):e63769.https://doi.org/10.1371/journal.pone.0063769.

Though *A. awamori* finds use in fermentation processes for producing foods and beverages, the human consumption of concentrated cultures of the fungus itself is not known. To the extent the fungus finds its way into foods and beverages, it is as an impurity.

BRIEF SUMMARY OF THE INVENTION

Provided herein are compositions of edible fungi, particularly filamentous fungi and edible fungi that form fungal pellets and methods for making compositions of such fungal pellets. In some embodiments, compositions comprise fungal pellets that are coated with one or more edible materials. In some embodiments, the edible composition comprises a pellet of an edible filamentous fungus and a first edible film, wherein the first edible film coats the pellet. In some embodiments, the compositions further comprise a second edible film, wherein the second edible film coats the pellet and wherein the second edible film is exterior to the first edible film. In some aspects of the edible compositions, the filamentous fungus extends through the first edible film. In some aspects of the edible compositions, the filamentous fungus extends through the second edible film. In some embodiments, the edible composition comprises at least three layers, wherein the inner-most layer comprises filamentous fungus in pellet form, a middle layer comprises a first edible film and an outer layer comprises a second edible film. In some aspects, the middle layer, the outer layer or a both the middle layer and outer layer comprise a filamentous fungus.

In some embodiments of the edible composition comprising the filamentous fungus, the edible filamentous fungus is selected from the group consisting of *Aspergillus* sp., *Penicillium* sp., *Agaricus* sp., *Amanita* sp., *Armillaria* sp., *Auricularia, Boletus* sp., *Bovista, Calbovista* sp., *Calvatia* sp., *Cantharellus* sp., *Chlorophyllum* sp., *Clitocybe* sp., *Clitopilus* sp., *Coprinus* sp., *Cortinarius* sp., *Craterellus* sp., *Entoloma* sp., *Flammulina* sp., *Fusarium* sp., *Gomphus* sp., *Grifola* sp., *Polypilus* sp., *Gyromitra* sp., *Helvetia* sp., *Hericium* sp., *Hydnum* sp., *Hygrophorus* sp., *Lactarius* sp., *Leccinum* sp., *Lentinus* sp., *Lepiota* sp., *Chlorophyllum* sp., *Lepiota* sp., *Lepista* sp., *Clitocybe* sp., *Lycoperdon* sp., *Marasmius* sp., *Morchella* sp., *Phlogiotis* sp., *Pholiota* sp., *Pleurocybella* sp., *Pleurotus* sp., *Pluteus* sp., *Polypilus* sp., *Grifola* sp., *Polyozellus* sp., *Polyporus* sp., *Ramaria* sp., *Rozites* sp., *Russula* sp., *Sparassis* sp., *Strobilomyces* sp., *Stropharia* sp., *Suillus* sp., *Terfezia* sp., *Tremella* sp., *Tricholoma* sp., *Tuber* sp., *Volvariella* sp., and *Rhizopus* sp. In some embodiments, the edible filamentous fungus is an *Aspergillus* species selected from the group consisting of *Aspergillus oryzae, Aspergillus sojae, Aspergillus kawachii, Aspergillus shirousamii*, and *Aspergillus awamori*. In some embodiments, the edible filamentous fungus is a *Penicillium* species selected from the group consisting of *Penicillium roseopurpureum, Penicillium, camemberti, Penicillium roqueforti, Penicillium chrysogenum, Penicillium roqueforti, Penicillium commune*, and combinations thereof. In an exemplary embodiment, the composition is one in which the fungal pellets comprise a coating of a first edible film and optionally a second edible film layered thereon.

In some embodiments of the edible composition comprising the filamentous fungus, e.g., in those embodiments in which the fungal pellets comprise fungal pellets and a coating of a first edible film and optionally a second edible film, the first edible film comprises an edible polymer. In some embodiments, the first edible film comprises an edible polymer selected from the group consisting of pullulan, alginate, cross-linked alginate, sodium alginate, propylene glycol alginate, pectin amylopectin, methoxyl pectin, inulin, carrageenan, cellulose gum, xanthan gum, locust bean gum, gellan gum, guar gum, tara gum, konjac gum, poly(styrenesulfonate), polyglutamic acid, alginic acid, poly(acrylic acid), poly(aspartic acid), poly(glutaric acid), dextransulfate, carboxymethylcellulose, modified carboxymethylcellulose, hyaluronic acid, chondroitin sulfate, heparin, methylcellulose, hydroxypropylmethyl cellulose, hydroxypropyl cellulose, polyvinyl pyrrolidone, maltodextrin, polydextrose, modified starch, tragacanth, gum acacia, modified gum acacia, xanthan gum alginate, agarose, gelatin, gelatin B, inulin, chitin, chitosan, and combinations thereof.

In some embodiments of the edible composition comprising the filamentous fungus, e.g., in those embodiments in which the fungal pellets comprise fungal pellets and a coating of a first edible film and optionally a second edible film, the second edible film comprises an edible polymer. In some embodiments, the second edible film comprises an edible polymer selected from the group consisting of pullulan, alginate, cross-linked alginate, sodium alginate, propylene glycol alginate, pectin amylopectin, methoxyl pectin, inulin, carrageenan, cellulose gum, xanthan gum, locust bean gum, gellan gum, guar gum, tara gum, konjac gum, poly(styrenesulfonate), polyglutamic acid, alginic acid, poly (acrylic acid), poly(aspartic acid), poly(glutaric acid), dextransulfate, carboxymethylcellulose, modified carboxymethylcellulose, hyaluronic acid, chondroitin sulfate, heparin, methylcellulose, hydroxypropylmethyl cellulose, hydroxypropyl cellulose, polyvinyl pyrrolidone, maltodextrin, polydextrose, modified starch, tragacanth, gum acacia, modified gum acacia, xanthan gum alginate, agarose, gelatin, gelatin B, inulin, chitin, chitosan, and combinations thereof. In some embodiments, the first edible film and the second edible film comprise the same edible polymer. In some embodiments, the first edible film and the second edible film comprise different edible polymers.

In some embodiments of the edible compositions comprising the filamentous fungus, e.g., in those embodiments in which the fungal pellets comprise fungal pellets and a coating of a first edible film and optionally a second edible film, the pellet of the edible filamentous fungus, the first edible coating, the second edible coating or any combination thereof comprises a flavor component, a color component, a vitamin, a nutritional mineral, an amino acid, branched chain amino acid, or any combination thereof. In an exemplary embodiment the flavor component, a color component, a vitamin, a nutritional mineral, an amino acid, branched chain amino acid, or any combination thereof is added to the filamentous fungus composition to supplement components of similar function naturally found in the filamentous fungus In some embodiments of the edible compositions comprising the filamentous fungus, the composition comprises an active filamentous fungal culture. In some embodiments, the composition comprises an inactive filamentous fungal culture. In some embodiments, the inactive filamentous fungal culture is heat inactivated. In some embodiments, the active or inactive filamentous fungal culture is a component of a composition comprising fungal pellets and a coating of a first edible film and optionally a second edible film.

In some embodiments, the edible compositions provided herein comprise at least 3 layers, such as a fungal pellet core, and a first edible film and a second edible film. In some embodiments, the composition comprises at least 4 layers, and wherein the outer layer is coated with one or more layers of a third edible film. In some embodiments, the third edible film comprises the same material comprised by the first edible film and/or the second edible film.

In some embodiments, the edible composition comprising the filamentous fungus, e.g., in those embodiments comprising fungal pellets and a coating of a first edible film and optionally a second edible film, the wt/wt % protein content of the composition is at least about 20%, 21%, 22%, 23%, 24%, 25%, 26%, 27%, 28%, 29%, 30%, 31%, 32%, 33%, 34%, 35%, 36%, 37%, 38%, 39%, or at least about 40% wt/wt protein content. In an exemplary embodiment, the wt/wt % protein content is or greater than about 40%. In some embodiments, the sugar content of the composition is less than about 10 g, less than about 5 g or less than about 2 g per 100 g of the composition. In some embodiments, the composition has at least one feature selected from the group consisting of chewiness, adhesiveness, hardness, and springiness. In some embodiments, the individual coated pellets of the edible composition have a wet density of from about 0.1 g/mL to about 10 g/mL. In some embodiments, the individual coated pellets of the edible composition have a wet density of from about 0.3 g/mL to about 5 g/mL. In some embodiments, the individual coated pellets of the edible composition have a dry density of from about 5 g/mL to about 10 g/mL.

In an exemplary embodiment, "chewiness" refers to the effort required to masticate the edible composition of the invention to consistency suitable for swallowing. Exemplary values for chewiness of the instant compositions are from about 0.02 to about 0.2

In an exemplary embodiment, "adhesiveness" refers to the force required to remove the edible composition of the invention adhering to the mouth. It is sometimes referred to as "stickiness", "tackiness" and/or "gooeyness". In various embodiments, the edible composition of the invention is characterized by an adhesiveness of from about 0-0.4 kg*sec In various embodiments, "hardness" refers to the maximum peak force applied in a first compression cycle mimicking a first bit of food. Exemplary values for hardness in an edible composition of the invention are from about 15 to about 180 g.

In some embodiments, the term "springiness" refers to how well an edible composition of the invention returns, or springs back to its original conformation after it has been deformed by a first compression. Exemplary values for springiness are from about 0.5 to about 1.8. For further information on these characteristics and their measurement, see, e.g., HIRAO, K., & TAKAHASHI, S. (1990). Effects of the Addition of Sugar to Tapioca Pearls Studies on the Cooking of Pearl Starch (Part 2). Journal of Home Economics of Japan, 41(2), 123-132; and Bulathgama, A. U., Gunasekara, G. D. M., Wickramasinghe, I., & Somendrika, M. A. D. (2020). Development of Commercial Tapioca Pearls used in Bubble Tea by Microwave Heat-Moisture Treatment in Cassava Starch Modification. European Journal of Engineering and Technology Research, 5(1), 103-106.

Also provided herein are liquid compositions comprising the edible compositions of the filamentous fungus, e.g., the fungal pellets, and a coating of a first edible film and optionally a second edible film. In some aspects, the liquid composition comprises the edible composition and an edible liquid. In some embodiments, the edible liquid is a beverage. In some embodiments, the edible liquid comprises alcohol. In some embodiments, the edible liquid comprises water, carbonated water, tea, milk, fruit juice, coffee, soda or any combination thereof. In some embodiments, the liquid composition is a boba-like beverage. In some aspects, the edible composition of the boba-like beverage comprises one or more features of a boba product selected from the group consisting of mouthfeel, texture, springiness, snap, resilience, hardness, softness, chewiness and any combination thereof. See, e.g., Example 9.

Also provided herein are methods of preparing the edible composition described herein. In some embodiments, the method comprises the steps of: (a) culturing an edible filamentous fungi in a first nutrient medium for a first time period, whereby the edible filamentous fungi forms one or more pellets; and (b) contacting the one or more pellets with a first edible film, whereby the one or more pellets are coated with the first edible film to form one or more first edible film coated pellets. In some embodiments, the method further comprises the step of inactivating the growth of the edible filamentous fungus between steps (a) and (b). In some embodiments, the method further comprises the step of contacting the one or more first edible film coated pellets with a second edible film, whereby the one or more first coated pellets are coated with the second edible film to form one or more second edible film coated pellets. In some embodiments, the method further comprises culturing the one or more first edible film coated pellets in a second nutrient medium for a second time period, whereby the filamentous fungus invades or grows through the first edible film of the one or more first edible film coated pellets to form one or more first edible film coated grown pellets. In some embodiments, the method further comprises the step of contacting the one or more first edible film coated grown pellets with a second edible film, whereby the one or more first coated grown pellets are coated with the second edible film to form one or more second edible film coated grown pellets. In some embodiments, the method further comprises the step of inactivating the growth of the edible filamentous fungus after the step of forming the one or more second edible film coated grown pellets. In some embodiments, the method further comprises culturing the one or more second edible film coated grown pellets in a second nutrient medium for a third time period, whereby the filamentous fungus invades or grows through the second edible film of the one or more second edible film coated grown pellets to form one or more second edible film coated 2× grown pellets. In some embodiments, the method further comprises the step of inactivating the growth of the edible filamentous fungus after the step of forming the one or more second edible film coated 2× grown pellets. In some embodiments, the first time period for the step of culturing an edible filamentous fungi in a first nutrient medium is from about 1 to about 7 days, about 1 day, about 1 to about 2 days, about 2 days, about 2 to about 3 days, about 3 days, about 3 to about 4 days, about 4 days, about 4 to about 5 days, about 5 days, about 5 to about 6 days, about 6 days, about 6 to about 7 days, about 7 days or more than about 7 days. In some embodiments, the second time period for the step of culturing an edible filamentous fungi in a second nutrient medium is from about 1 to about 7 days, about 1 day, about 1 to about 2 days, about 2 days, about 2 to about 3 days, about 3 days, about 3 to about 4 days, about 4 days, about 4 to about 5 days, about 5 days, about 5 to about 6 days, about 6 days, about 6 to about 7 days, about 7 days or more than about 7 days. In some embodiments where the method comprises a third time period of culturing, the third time period is from about 1 to about 7 days, about 1 day, about 1 to about 2 days, about 2 days, about 2 to about 3 days, about 3 days, about 3 to about 4 days, about 4 days, about 4 to about 5 days, about 5 days, about 5 to about 6 days, about 6 days, about 6 to about 7 days, about 7 days or more than about 7 days.

In exemplary embodiments of the methods for making coated fungal pellets and edible compositions as described herein, the edible filamentous fungus is selected from the group consisting of *Aspergillus* sp., *Penicillium* sp., *Agaricus* sp., *Amanita* sp., *Armillaria* sp., *Auricularia, Boletus* sp., *Bovista, Calbovista* sp., *Calvatia* sp., *Cantharellus* sp., *Chlorophyllum* sp., *Clitocybe* sp., *Clitopilus* sp., *Coprinus* sp., *Cortinarius* sp., *Craterellus* sp., *Entoloma* sp., *Flammulina* sp., *Fusarium* sp., *Gomphus* sp., *Grifola* sp., *Polypilus* sp., *Gyromitra* sp., *Helvella* sp., *Hericium* sp., *Hydnum* sp., *Hygrophorus* sp., *Lactarius* sp., *Leccinum* sp., *Lentinus* sp., *Lepiota* sp., *Chlorophyllum* sp., *Lepiota* sp., *Lepista* sp., *Clitocybe* sp., *Lycoperdon* sp., *Marasmius* sp., *Morchella* sp., *Phlogiotis* sp., *Pholiota* sp., *Pleurocybella* sp., *Pleurotus* sp., *Pluteus* sp., *Polypilus* sp., *Grifola* sp., *Polyozellus* sp., *Polyporus* sp., *Ramaria* sp., *Rozites* sp., *Russula* sp., *Sparassis* sp., *Strobilomyces* sp., *Stropharia* sp., *Suillus* sp., *Terfezia* sp., *Tremella* sp., *Tricholoma* sp., *Tuber* sp., *Volvariella* sp., *Rhizopus* sp, and a combination thereof. In some embodiments of the methods, the edible filamentous fungus is an *Aspergillus* species selected from the group consisting of *Aspergillus oryzae, Aspergillus sojae, Aspergillus kawachii, Aspergillus shirousamii*, and *Aspergillus awamori*. In some embodiments of the methods, the edible filamentous fungus is a *Penicillium* species selected from the group consisting of *Penicillium roseopurpureum, Penicillium, camemberti, Penicillium roqueforti, Penicillium chrysogenum, Penicillium roqueforti, Penicillium commune*, and a combination thereof.

In exemplary embodiments of the methods for making coated fungal pellets and edible compositions herein, the coated fungal pellets may include a first edible film and optionally, a second edible film. In various embodiments of the methods, the first edible film comprises an edible polymer. In exemplary embodiments of the methods, the second edible film comprises an edible polymer. In exemplary embodiments of the methods, the first edible film comprises a material is selected from the group consisting of pullulan, alginate, cross-linked alginate, sodium alginate, propylene glycol alginate, pectin amylopectin, methoxyl pectin, inulin, carrageenan, cellulose gum, xanthan gum, locust bean gum, gellan gum, guar gum, tara gum, konjac gum, poly(styrenesulfonate), polyglutamic acid, alginic acid, poly(acrylic acid), poly(aspartic acid), poly(glutaric acid), dextransulfate, carboxymethylcellulose, modified carboxymethylcellulose, hyaluronic acid, chondroitin sulfate, heparin, methylcellulose, hydroxypropylmethyl cellulose, hydroxypropyl cellulose, polyvinyl pyrrolidone, maltodextrin, polydextrose, modified starch, tragacanth, gum acacia, modified gum acacia, xanthan gum alginate, agarose, gelatin, gelatin B, inulin, chitin, chitosan, and a combination thereof. In certain embodiments of the methods, the second edible film comprises a material is selected from the group consisting of pullulan, alginate, cross-linked alginate, sodium alginate, propylene glycol alginate, pectin amylopectin, methoxyl pectin, inulin, carrageenan, cellulose gum, xanthan gum, locust bean gum, gellan gum, guar gum, tara gum, konjac gum, poly(styrenesulfonate), polyglutamic acid, alginic acid, poly(acrylic acid), poly(aspartic acid), poly(glutaric acid), dextransulfate, carboxymethylcellulose, modified carboxymethylcellulose, hyaluronic acid, chondroitin sulfate, heparin, methylcellulose, hydroxypropylmethyl cellulose, hydroxypropyl cellulose, polyvinyl pyrrolidone, maltodextrin, polydextrose, modified starch, tragacanth, gum acacia, modified gum acacia, xanthan gum alginate, agarose, gelatin, gelatin B, inulin, chitin, chitosan, and a combination thereof. In embodiments of the methods, the first edible film and the second edible film comprise the same material, e.g., the same edible polymer. In some embodiments of the methods, the first edible film and the second edible film comprise different material. In certain embodiments of the methods, the method further comprises incorporating a flavor component, a color component, a vitamin, a nutritional mineral, an amino acid, branched chain amino acid, or any combination thereof into the one or more pellets, first edible film, second edible film or any combination thereof.

In various embodiments, the present invention provides novel products incorporating a multi-layered bead (e.g. coated fungal pellet) formed at least partially from a culture of *Aspergillus awamori*. The products are incorporated into food and beverages, which are appropriate for consumption by humans, livestock and other animals. In various embodiments, the culture in the product is an active culture. In exemplary embodiments, the product is at least partially inactivated, e.g., pasteurized, thereby minimizing or eliminating the fungal activity.

In some embodiments, the composition is incorporated as a component of a suspension of the composition in a liquid carrier, which is formatted as a beverage. In various embodiments, either or both the composition and the carrier are colored and/or flavored, providing a beverage with consumer appeal.

Methods are provided herein for producing edible fungal products with various colors, flavors, shapes, sizes, densities, and biological activities. The methods consist of processes for the extraction of flavors, nutrients, and colors from organic or inorganic sources as well as processes for producing fungal biomass with desired physical and chemical characteristics. A key innovation of the present invention is the utilization of fungal biomass deactivation and pellet-coating steps which allow control over the texture, flavor, color, and nutrient characteristics of the resulting products. In various embodiments, one or both of the coating and deactivation processes are utilized with one or more of the other methods of this invention to create a wide array of products with novel flavor, texture, and nutrient characteristics, depending on the intended applications.

This invention can be used to produce multiple novel and nutritious food products. An exemplary product is referred to as "mycoBoba", a healthy fungus-based alternative to the popular tapioca "boba" added to tea beverages or to be used in other foods. The instant process can be used to produce tasty, nutritious, and attractive "boba" using the filamentous fungi *Aspergillus awamori*, an edible fungus traditionally used in soy sauce and citric acid production. In an exemplary method, the fungus is grown in controlled conditions to create essentially spherical pellets. Exemplary pellets are flavored with natural extracts, which, in various embodiments, are derived from low-cost byproducts of food processing industries, such as carrot pomace, almond hulls, and spent coffee grains. The present "mycoBoba" can be produced with many layers of colors and flavors and its texture can be fine-tuned to exhibit the right amount of chew and snap for the consumers. Compared to most other "boba" products on the market, the instant "mycoBoba" contains much less sugar and a higher content of protein, healthy fats, vitamins, antioxidants, and enzymes. The present fungal production process provides novel beverages that contain digestive enzymes and nutrients.

BRIEF DESCRIPTION OF THE DRAWINGS

FIG. 3. Sugar extraction at 30° C.

FIG. 15. Carrot (A) and red beet pellets (B) after heat treatment.

DETAILED DESCRIPTION OF THE INVENTION

I. Introduction

Figure 1:
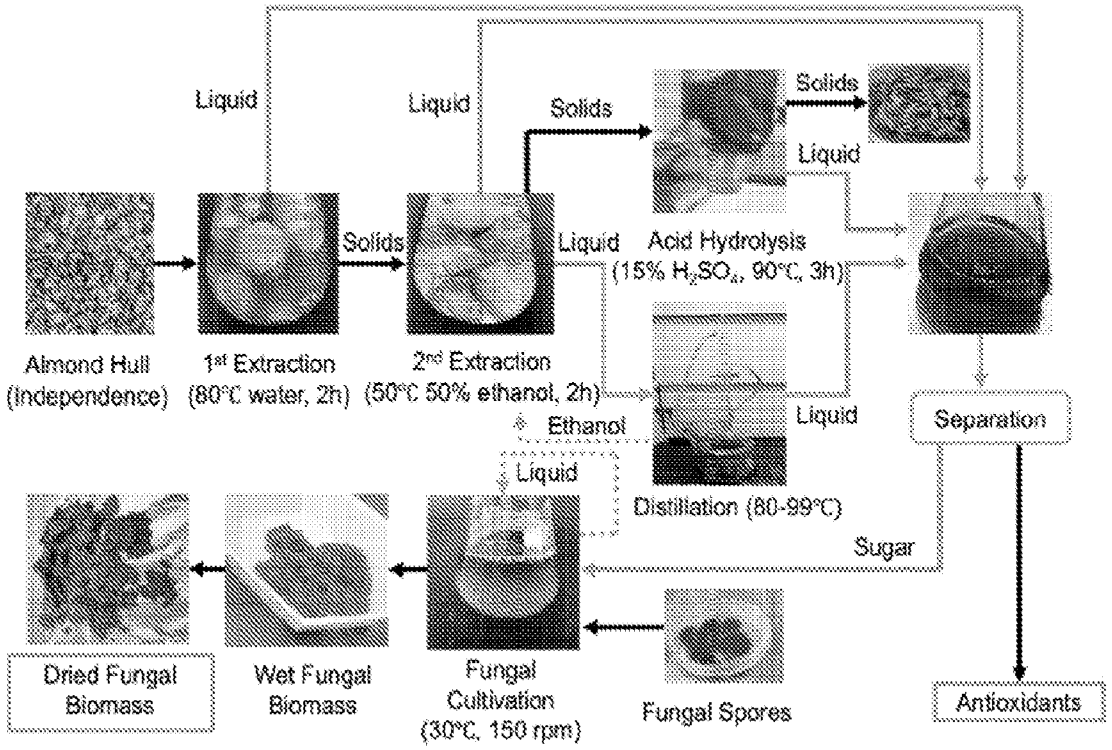
FIG. 1. Processing of almond hulls into antioxidants and edible fungi.

Reference will now be made in detail to implementation of exemplary embodiments of the present disclosure as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present disclosure will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the exemplary embodiments, as will be apparent to those skilled in the art. The specific exemplary embodiments described herein are offered by way of example only, and the disclosure is to be limited only by the terms of the appended claims, along with the full scope of equivalents to which such claims are entitled.

Unless defined otherwise, all technical and scientific terms used herein have the same meaning as commonly understood by one of ordinary skill in the art (e.g., in cell culture, molecular genetics, nucleic acid chemistry, hybridisation techniques and biochemistry). Standard techniques are used for molecular, genetic and biochemical methods (see generally, Sambrook et al., Molecular Cloning: A Laboratory Manual, 2d ed. (1989) Cold Spring Harbor Laboratory Press, Cold Spring Harbor, N.Y. and Ausubel et al., Short Protocols in Molecular Biology (1999) 4.sup.th Ed, John Wiley & Sons, Inc. which are incorporated herein by reference) and chemical methods. In addition Harlow & Lane, A Laboratory Manual Cold Spring Harbor, N.Y., is referred to for standard Immunological Techniques.

II. Definitions

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±about 20%, in some embodiments ±about 10%, in some embodiments ±about 5%, in some embodiments ±about 1%, in some embodiments ±about 0.5%, and in some embodiments ±about 0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the term "bioactive agent" refers to an agent which possesses therapeutic, prophylactic, or diagnostic properties in vivo, for example when administered in a product of the invention to an animal, including mammals, such as humans. The bioactive agent can include organic molecules such as a drug, peptide, protein (e.g., a fungal protein), carbohydrate (including monosaccharides, oligosaccharides, and polysaccharides), nucleoprotein, mucoprotein, lipoprotein, synthetic polypeptide or protein, nucleotide, nucleoside, lipid, hormone, vitamin, (e.g., vitamin C, vitamin D and vitamin E), mineral, steroids, hormones, antibiotics, antivirals, antihistamines, nonsteroidal and steroidal anti-inflammatory compounds, antipsychotics or combinations thereof.

Other non-limiting examples of active agents include anti-infectives such as nitrofurazone, sodium propionate, antibiotics, including penicillin, tetracycline, oxytetracycline, chlorotetracycline, bacitracin, nystatin, streptomycin, neomycin, polymyxin, gramicidin, chloramphenicol, erythromycin, and azithromycin; sulfonamides, including sulfacetamide, sulfamethizole, sulfamethazine, sulfadiazine, sulfamerazine, and sulfisoxazole, and anti-virals including idoxuridine; antiallergenics such as antazoline, methapyritene, chlorpheniramine, pyrilamine prophenpyridamine, hydrocortisone, cortisone, hydrocortisone acetate, dexamethasone, dexamethasone 21-phosphate, fluocinolone, triamcinolone, medrysone, prednisolone, prednisolone 21-sodium succinate, and prednisolone acetate; desensitizing agents such as ragweed pollen antigens, hay fever pollen antigens, dust antigen and milk antigen; decongestants such as phenylephrine, naphazoline, and tetrahydrazoline; miotics and anticholinesterases such as pilocarpine, esperine salicylate, carbachol, diisopropyl fluorophosphate, phospholine iodide, and demecarium bromide; parasympatholytics such as atropine sulfate, cyclopentolate, homatropine, scopolamine, tropicamide, eucatropine, and hydroxyamphetamine; sympathomimetics such as epinephrine.

The term "crosslinking" as used herein refers to the use of a substance (molecular or ionic) to link at least two molecules (whether the same or different) through a chemical bond, such as a covalent, ionic, and/or electrostatic bond.

"Edible", as used herein, refers to compositions that are safe for humans to eat. An exemplary component is recognized as "generally recognized as safe" (GRAS) as this term is defined under sections 201(s) and 409 of the Federal Food, Drug, and Cosmetic Act.

The term "encapsulation" as used herein refers to the formation of a complete or partial barrier around a particle or an object for specifically controlling the movement of substances into or out of encapsulated particle or object.

It should be understood that the term "food" is used in a broad sense herein to include a variety of substances that can be ingested by humans, such as beverages and medicinal capsules or tablets.

Functional food—The term "functional food" is a food having a health-promoting or disease-preventing property beyond the basic function of supplying nutrients. Functional foods include foods fortified with health-promoting additives, like "vitamin-enriched" products, and foods with live probiotic cultures and/or prebiotic ingredients.

As used herein, an "off-flavor" means a flavor that a consumer would not expect and/or is undesired in a food, for example a baked food, such as a beverage. Examples of off-flavors include flavors of cabbages or fish. Although specific flavors may be measured by modern analytical techniques such as Gas Chromatography-Mass Spectrometry (abbreviated as GC-MS), often the most convenient and effective tool for measuring off-flavors is a tasting panel comprised of humans. In connection with human perception of off flavors, these may be determined by a sensory panel of, for example, 10 people, where absence of a flavor or odor is established when 2 or fewer of the 10 people can detect the flavor, or by performing enough tests to establish statistical significance.

Palatability is defined as "the hedonic evaluation of oro-sensory food cues under standardized conditions". Taste, odor, appearance, texture, temperature, sound, and trigeminal senses which together constitute flavor are sensory characteristics of a food which people use to assess palatability. https://www.ncbi.nlm.nih/gov/pmc/articles/PMC5332909/. Exemplary compositions of the invention are "palatable" to humans, e.g., to an average consumer of analogs of the particular composition in which the fungal compositions of the invention are not present in the analogous product.

Probiotic—The term "probiotic" refers to microorganisms that form at least a part of the transient or endogenous flora and thereby exhibit a beneficial prophylactic and/or therapeutic effect on the host organism. Probiotics are generally known to be safe by those skilled in the art. Although not wishing to be bound by any particular mechanism, the prophylactic and/or therapeutic effect of a microorganism of or incorporated into this invention results from competitive exclusion of pathogen binding sites, competitive inhibition of growth of pathogens due to superior colonization, parasitism of undesirable microorganisms, production of organic and carboxylic acid and/or production of other extracellular products having antimicrobial activity, or combinations thereof. Typically, probiotics are-used to prevent the emergence of a colonic or systemic disease, as opposed to most drugs which are used to cure a disease. These colonic or intestinal pathologies include antibiotic associated colitis, inflammatory bowel diseases (IBS) such as ulcerative colitis and Crohn's disease, colorectal cancer, necrotizing enterocolitis and ileocecitis. The systemic disorders include gut origin septicemia, pancreatitis and multiple organ system failure.

Prebiotic—The term "prebiotic" refers to non-digestible food ingredients that stimulate the growth and/or activity of microorganisms in the digestive system which are beneficial to the health of the body. Typically, prebiotics are carbohydrates (such as non-starch polysaccharides, oligosaccharides, sugar acids and alcohols) but the definition also includes non-carbohydrates (such as lignin and glycoproteins). The prebiotic definition does not emphasize a specific microorganism group. Generally, a prebiotic can increase the number and/or activity of groups of microorganisms that have several beneficial effects on the host, especially in terms of improving digestion (including enhancing mineral absorption) and the effectiveness and intrinsic stimulation of the immune system.

The term "stabilizing agent" refers to a compound that can improve the material properties, particularly water resistance and mechanical properties of the films formed from the coating composition, and also the affinity between the cellulose nanomaterial and the inorganic salt component.

The term "film" or "coating" as used herein refers to a layer of the composition created on the exterior of an object, such as on the exterior of a filamentous fungus pellet of the invention. The layer need not have a uniform thickness or be completely homogenous in composition. The film or coating need not cover the entire object to which it is applied. In some embodiments, the film or coating can substantially coat the object. In such embodiments, the film or coating can cover about 10%, 20%, 30%, 40%, 50%, 60%, 70%, 80%, or about 90% of the surface area of the object. In other embodiments, the film or coating can completely coat the object—that is it can cover about 100% of the object. In some embodiments, the film or coating can have a thickness that varies by about 10%, 20%, 30%, 40%, 50%, 60%, 70%, 80%, or about 90% over the object.

III. Embodiments

A. Compositions

In various embodiments, the present invention provides novel products incorporating an edible pellet of a filamentous fungus (also referred to herein as a "fungal pellet"). In some embodiments, the filamentous fungus is a fungus capable of forming mycelium. In some embodiments, the filamentous fungus is a fungus capable of forming fungal balls or pellets when the fungus or spores of the fungus are cultured in liquid media. In some embodiments, the fungus may not be a taxonomically defined as a filamentous fungus but is a mold or mushroom capable of forming fungal balls or pellets when the fungus or spores of the fungus are cultured in liquid media. In some embodiments, the filamentous fungus is one or more of *Aspergillus* sp., *Penicillium* sp., *Agaricus* sp., *Amanita* sp., *Armillaria* sp., *Auricularia, Boletus* sp., *Bovista, Calbovista* sp., *Calvatia* sp., *Cantharellus* sp., *Chlorophyllum* sp., *Clitocybe* sp., *Clitopilus* sp., *Coprinus* sp., *Cortinarius* sp., *Craterellus* sp., *Entoloma* sp., *Flammulina* sp., *Fusarium* sp., *Gomphus* sp., *Grifola* sp., *Polypilus* sp., *Gyromitra* sp., *Helvella* sp., *Hericium* sp., *Hydnum* sp., *Hygrophorus* sp., *Lactarius* sp., *Leccinum* sp., *Lentinus* sp., *Lepiota* sp., *Chlorophyllum* sp., *Lepiota* sp., *Lepista* sp., *Clitocybe* sp., *Lycoperdon* sp., *Marasmius* sp., *Morchella* sp., *Phlogiotis* sp., *Pholiota* sp., *Pleurocybella* sp., *Pleurotus* sp., *Pluteus* sp., *Polypilus* sp., *Grifola* sp., *Polyozellus* sp., *Polyporus* sp., *Ramaria* sp., *Rozites* sp., *Russula* sp., *Sparassis* sp., *Strobilomyces* sp., *Stropharia* sp., *Suillus* sp., *Terfezia* sp., *Tremella* sp., *Tricholoma* sp., *Tuber* sp., *Volvariella* sp., and *Rhizopus* sp. In some embodiments, the filamentous fungus is an *Aspergillus* species, such as *Aspergillus oryzae, Aspergillus sojae, Aspergillus kawachii, Aspergillus shirousamii, Aspergillus awamori* or a combination thereof. In some embodiments, the filamentous fungus is a *Penicillium* species, such as *Penicillium roseopurpureum, Penicillium, camemberti, Penicillium roqueforti, Penicillium chrysogenum, Penicillium roqueforti, Penicillium commune* or a combination thereof.

By adjusting the content of the media in which the fungus is cultured, the relative content of protein, fat and carbohydrate of the pellet may be readily engineered to provide a pre-selected ratio of these components. In some embodiments, the pellet includes at least about 5%, at least 10%, at least 15%, at least 20%, at least 25%, or at least 30% protein (w/w). at least 20%, 21%, 22%, 23%, 24%, 25%, 26%, 27%, 28%, 29%, 30%, 31%, 32%, 33%, 34%, 35%, 36%, 37%, 38%, 39%, or at least about 40% protein (wt/wt). In an exemplary embodiment, the pellet includes greater than 40% wt/wt.

In an exemplary embodiment, the carbohydrate content of the pellet is less than about 40%, less than about 30%, less than about 20% or less than about 10% (w/w). In some embodiments, the pellet has a low sugar content. In some embodiments, the pellet contains less than about 10 g, less than about 5 g or less than about 2 g per 100 g of pellet or less than about 10%, less than about 5% or less than about 2% sugar wt/wt.

In various embodiments, the fat content of the pellet is less than about 40%, less than about 30%, less than about 20% or less than about 10% (w/w).

*Aspergillus awamori*. In an exemplary embodiment, the product is a food or beverage. In an exemplary embodiment, the food or beverage is intended for consumption by a human and is composed of GRAS components. The food or beverage can include one or more additive, e.g., a color, a flavor, an antioxidant, a vitamin, a nutritional mineral, a preservative, an emulsifier, a salt, a saccharide, a sweetener, and the like.

In various embodiments, the product is a beverage in which a population of *A. awamori* pellets are suspended in a liquid carrier. In an exemplary embodiment, the beverage is provided in a sealed container containing one or more than one serving size. In various embodiments, a serving size is about 6 ounces, about 12 ounces, about 16 ounces or about 20 ounces.

The liquid carrier of a beverage can be carbonated or flat. The carrier can include a natural or artificial sweetener, a flavor, or a flavor masking element masking an off-flavor.

The *A. awamori* pellets in a product of the invention can include an active culture of *A. awamori*, or the pellets or entire product can be pasteurized. In various embodiments, the product is a functional food. In an exemplary embodiment, the functional food has probiotic and/or prebiotic characteristics. In an exemplary functional food of the invention, the probiotic and/or prebiotic characteristics are imparted to the functional food by the *A. awamori* in the food.

Exemplary pellets and preparations containing these pellets may be active fungal cultures. In various embodiments, the pellet and/or the preparation containing the fungus are pasteurized or otherwise sterilized, rendering the culture inactive. In some embodiments, heat treatment, such as heat is used to inactivate the fungal culture and surprisingly as described further herein, such heat treatment inactivates the culture without substantial alteration of the shape, mechanical or gustatory properties of the pellets or the preparations containing them.

Layered Compositions

In various embodiments, provided herein are layered and multilayered compositions formed with the fungal pellets. In some embodiments, the fungal pellet forms the core or center of the composition and a coating is provided that surrounds or covers the outer surface of some or all of the pellet. In some embodiments, the coating is an edible film. In some aspects, the fungus of the pellet is an active culture and under selected conditions, the fungus grows into or through the coating, e.g., edible film, such that the fungus extends through the coating or portions of the coating. In some embodiments, a second coating is provided that further coats in whole or in part the fungal pellet and the first coating.

Figure 7A:
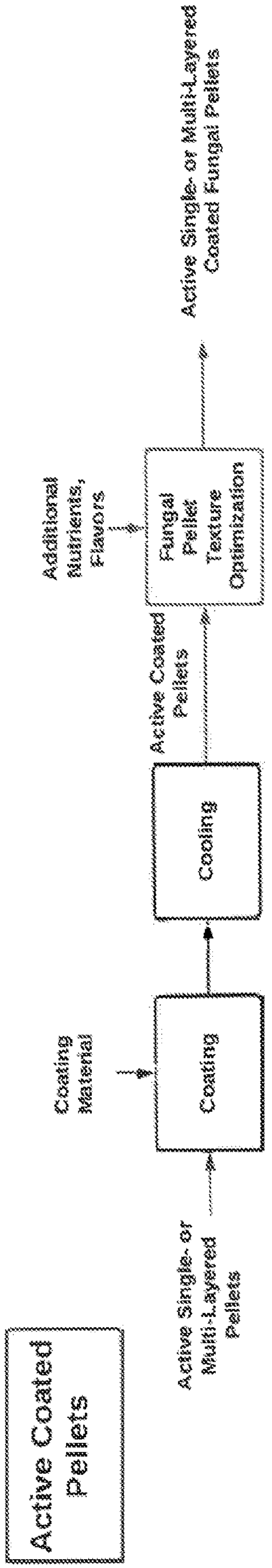
FIG. 7A Live, FIG. 7B Deactivated.
Figure 7B:
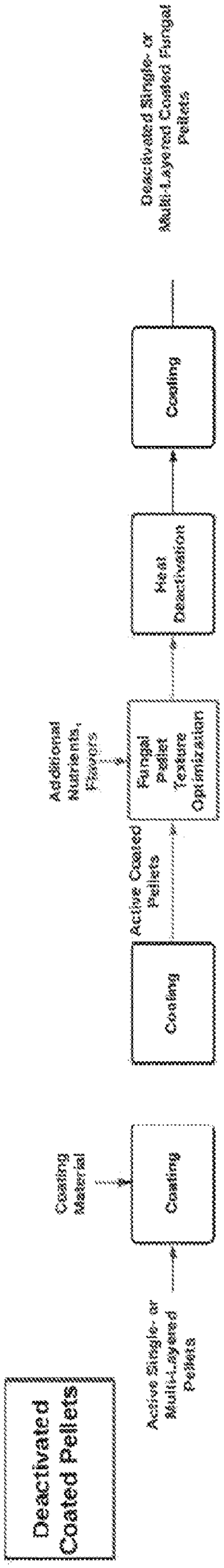
FIG. 7. Process flow diagram for the production of "mycoBoba" beverage with coated fungal pellets.

In an exemplary embodiment, the particle (i.e., a pellet) is formed by first culturing the fungus, such as an *A. awamori* culture, coating pellets formed from the first *A. awamori* culture with the first edible film and resubmitting the coated pellet to culture conditions such that the first *A. awamori* culture grows through the first edible film. Such exemplary pellets may incorporate the first edible film throughout the depth of the pellet (FIGS. 7A and 7B). The textural properties of such pellets may be distinct from those pellets having a single first edible film coating in one or more characteristics. For example, such a coated pellet imparting a sensation of "hardness" or "resilience" such as typical of a standard boba pellet. Pellets having a single edible film on the surface may provide a sensation of a "snap" as the film is broken on chewing.

In some embodiments, a fungal pellet is coated with a first edible film. In some embodiments, the first edible film covers about 10%, 20%, 30%, 40%, 50%, 60%, 70%, 80%, or about 90% of the surface area of the pellet. In some embodiments, the first edible film covers essentially all of the surface area of the pellet, such as about 100% of the surface area of the pellet. In some embodiments, the first edible film is porous or semi-porous, such that the coating and/or the pellet may interact with or be provided with one or more additives. Representative additives include, without limitation, a color component, a flavor component, a sweetener, a taste masking component, a salt, and a component influencing the texture, durability or mouth feel of the particle. An exemplary additive is a bioactive agent. In an exemplary embodiment, the invention provides a method for improving the palatability of a bioactive agent by incorporating the bioactive agent into a pellet of the invention. As will be apparent to those of skill in the art, the identity and amount of these additives can be adjusted by the ordinarily skilled worker to construct a particle, e.g., a pellet or coated pellet, with a desired property or properties.

In some embodiments, the fungus grows through or extends into the first edible film. In some aspects, the fungus extends completely or essentially fully through the first edible film and forms a layer on the exterior of the first edible film, such that the fungal pellet forms the core, the first edible film forms a middle layer and the growth of the fungus forms a fungal overgrowth layer or partial layer around the exterior of the structure.

In some embodiments, a second edible film is provided that forms a layer on the exterior of the first film. In some aspects, the second edible film coats the layer or partial layer of fungus extending through the first edible film.

In some embodiments, the fungus may be inactivated, such as by heat inactivation, before applying the second edible film or after applying the second edible film. In other embodiments, the fungus may be an active culture before applying the second edible film or after applying the second edible film. In some embodiments, the layering is repeated such that the pellet structures contain 3, 4, 5 or more than 5 layers of edible film.

In various embodiments, the pellet of the invention includes two or more distinct, distinguishable elements. In various embodiments, the elements are distinguishable by visual examination, a difference in flavor and/or a difference in texture. An exemplary pellet of the invention is essentially spherical in shape. In some embodiments, the pellet, viewed in cross-section includes a first outer annular element and a second element internal to the void in the annular element. In some embodiments, the surface defined by the void in the annulus is in contact with the second element internal to the annulus across essentially the entire circumference of the inner surface of the annular element and the outer surface of the element internal to the annulus. In various embodiments, the first annular element and the second element are of a first color and a second color, respectively. In various embodiments, the first and second colors are different colors. In various embodiments, the first annular element and the second element are of a first material and a second material, respectively. In various embodiments, the first and second materials are different materials. In various embodiments, the first annular element and the second element are of a first flavor and a second flavor, respectively. In various embodiments, the first and second flavors are different flavors.

Coating Compositions

In various embodiments, the fungal pellets are coated with one or more edible films. In some embodiments, components of the coating compositions of use in the compositions described herein are edible and, in some embodiments, they have a regulatory status of generally recognized as safe (GRAS) as provided by the United States Food and Drug Administration. In other embodiments, the components are listed on the Environment Protection Agency's 4A and 4B lists as being safe for the environment.

In some embodiments, the edible film is one or more of pullulan, alginate, cross-linked alginate, sodium alginate, propylene glycol alginate, pectin amylopectin, methoxyl pectin, inulin, carrageenan, cellulose gum, xanthan gum, locust bean gum, gellan gum, guar gum, tara gum, konjac gum, poly(styrenesulfonate), polyglutamic acid, alginic acid, poly(acrylic acid), poly(aspartic acid), poly(glutaric acid), dextransulfate, carboxymethylcellulose, modified carboxymethylcellulose, hyaluronic acid, chondroitin sulfate, heparin, methylcellulose, hydroxypropylmethyl cellulose, hydroxypropyl cellulose, polyvinyl pyrrolidone, maltodextrin, polydextrose, modified starch, tragacanth, gum acacia, modified gum acacia, xanthan gum alginate, agarose, gelatin, gelatin B, inulin, chitin, and chitosan. The film components can be combined in any ratio or manner providing a useful coated composition of the invention.

An edible film may be based on a polymer. Exemplary polymers include pullulan, sodium alginate, pectin, gelatin, carrageenan, xanthan gum and locust bean gum, poly(styrenesulfonate), polyglutamic or alginic acids, poly(acrylic acid), poly(aspartic acid), poly(glutaric acid), and natural polyelectrolytes with similar ionized groups such as dextransulfate, carboxymethylcellulose, hyaluronic acid, sodium alginate, gelatine B, chondroitin sulfate, heparin, methylcellulose, hydroxypropylmethyl cellulose, hydroxypropyl cellulose, polyvinyl pyrrolidone, maltodextrin, polydextrose, modified starches (such as "Purity Gum 59" Marketed by National Starch) and natural gums such as gum tragacanth, gum acacia and xanthan gum.

These polymers can be synthesized, isolated, or commercially obtained. In some instances, the polymer is a homopolymer or a copolymer. The polymer can be prepared by adding a plasticizer, an emulsifier, a sweetener, an acidulant, a flavoring and other additives thereto.

Exemplary plasticizers include, without limitation, glycerin, propylene glycol, polyethylene glycol or others known to the art. These components may be stirred together, for example, with a magnetic stirrer (low energy) for a short period of time (e.g. 2 minutes) whereupon the coating suspension is ready for coating the pellet.

Exemplary films can be formulated with ingredients, which are commonly found in food (e.g., cellulose, calcium carbonate, water, glycerin, alginate, agar, etc.) thereby avoiding consumer concerns over food safety. In some embodiments, the film may be fibrous or crystalline and can form a water-resistant coating over the object being coated.

Alginates find uses in various fields, e.g. in pharmaceutical and food products where they are applied e.g. as thickeners, stabilizers and gelling agents. Their use in pharmaceutical compositions is mentioned in a number of patents and patent applications. Thus, U.S. Pat. No. 6,923,988 assigned to Lipocine, Inc. discloses a solid pharmaceutical composition for improved delivery of active ingredients.

U.S. Pat. No. 6,923,981 assigned to Warner-Lambert Company discloses fast dissolving orally consumable films for mouth hygiene. A listing of film forming agents is given including sodium alginate and pullulan.

U.S. Pat. Nos. 6,656,493 and 6,740,332, both assigned to Wm. Wrigley Jr. Company disclose edible film formulations for mouth hygiene. The film formulations contain at least three types of film forming agents, viz. a maltodextrin, a hydrocolloid and a filler.

US patent application No. 20050013847, assigned to FMC Corporation, relates to delivery systems comprising a homogenous, thermoreversible gel film, wherein the gel film comprises: a film forming amount of a water soluble thermoreversible alginate and optionally at least one of a plasticizer, a second film former, a bulking agent, and a pH controlling agent; and an active substance. The exemplified process for preparing the gel film comprises heating the alginate-containing mixture to an elevated temperature to form a homogeneous molten composition.

U.S. Patent Application Publication No. 2005/0031675 discloses a soluble edible film using pullulan as a film forming material, and U.S. Pat. No. 6,656,493 discloses a water-soluble edible film comprising sodium alginate and maltodextrin. U.S. Pat. Nos. 6,709,669, 7,132,113 and 6,419,903 disclose a soluble edible film prepared by using gelatin, an edible film comprising hydroxypropylcellulose and a modified starch and an edible film comprising hydroxypropylmethyl cellulose and a pregelatinized starch, respectively.

U.S. Pat. No. 10,570,262 discloses a polymer formed from protein, which is also of use in exemplary embodiments of the invention.

In any or all of the disclosed embodiments, the composition can further comprise a stabilizing agent. The stabilizing agent can be a carboxy- or sulfate-containing polysaccharide selected from alginic acid, sodium alginate, cellulose and cellulose derivatives (e.g., carboxymethyl cellulose), pectic polysaccharides, carboxymethyl dextran, xanthan gum, carboxymethyl starch, hyaluronic acid, dextran sulfate, pentosan polysulfate, carrageenans, fuciodans, or a combination of two or more thereof. In some embodiments, the stabilizing agent is present in an amount ranging from about 0.05 wt/v % to about 1 wt/v %, such as about 0.05 wt/v % to about 0.5 wt/v %. In any or all of the disclosed embodiments, the stabilizing agent can be sodium alginate, carboxymethyl cellulose, or a combination thereof. In some embodiments, the sodium alginate is present in an amount of 0.5 wt/v %. In some embodiments, the carboxymethyl cellulose is present in an amount of 0.1 wt/v %.

In other disclosed embodiments, the coating composition can further comprise one or more additive agents that when applied to the pellet to be coated can protect the pellet from (and/or reduce) water loss, UV damage, and/or loss of physical integrity, all of which are responsible for significant quality deterioration, microbial spoilage and monetary losses to the food industry. Examples of suitable additive agents include, but are not limited to, film forming materials, such as a non-starch polysaccharide (e.g., methyl cellulose, carboxymethyl cellulose or other cellulose derivatives, chitosan, and the like), protein, or a fruit or vegetable puree; plasticizers (such as, but not limited to, glycerin, propylene glycol, sorbitol solutions, sorbitan monostearate, sorbitan monoleate, lactamide, acetamide DEA, lactic acid, polysorbate 20, 60 and 80, polyoxyethylene-fatty esters and ethers, sorbitan-fatty acid esters, polyglyceryl-fatty acid esters, triacetin, dibutyl sebacate, polyethylene glycol, such as PEG 400, or combinations thereof); antimicrobial agents or antioxidant agents, which can be selected from suitable essential oils (including, but not limited to thyme oil, clove oil, oregano, lemongrass, marjoram, cinnamon, coriander, or combinations thereof), and other suitable components disclosed herein that also exhibit antimicrobial and/or antioxidant activity (e.g., potassium sorbate, chitosan, a quaternary ammonium salt, or combinations thereof); suspension agents/stabilizers (including, but not limited to xanthan gum, guar gum, carrageenan, carbopol polymers, and combinations thereof); emulsifiers (including, but not limited to pemulin emulsifiers; lecithin; polysorbate surfactants (or TWEEN surfactants), e.g., polyoxyethylene (20) sorbitan monolaurate, also referred to as "TWEEN 20," or polyoxyethylene (80) sorbitan monolaurate, also referred to as "Tween 80"; sorbitan surfactants (or SPAN surfactants), e.g., sorbitan monolaurate, also referred to as "SPAN 20," or sorbitan monooleate, also referred to as "SPAN 80"; and combinations thereof); mixing aids/defoamers (including, but not limited to surfynol products, silicones, such as simethicone, silica gel, and combinations thereof), preservatives (including, but not limited to sorbic acid, benzoic acid, and salts thereof; nitrates (including, but not limited to potassium nitrate or sodium nitrate); chitosan; essential oils; organic acids; bacteriocins (including, but not limited to nisin); and phenolic compounds); cosolvents (such as, but not limited to alcohols, such as isopropanol); and combinations thereof. In some embodiments, certain additional components can serve multiple purposes in the composition. For example, some additive components, such as preservatives and chitosan, can exhibit antimicrobial and/or antioxidant activity, as can certain stabilizing agents, such as acids, and phenolic compounds.

The amount of the additive agent present in the coating composition can be modified as necessary.

In some embodiments, plasticizers can be present in an amount ranging from 0 to about 10%, such as about 0.1% to about 10%, about 0.2% to about 9%, about 0.3% to about 8%, about 0.4% to about 7%, about 0.5% to about 6%, about 0.75% to about 5%, or about 1% to about 4%, or about 0.01% to about 0.5%.

In embodiments using chitosan, the amount of chitosan present may range from about 0 to about 3%, such as about 0.05% to 2%, or about 0.05% to about 1%, or about 0.05% to about 0.5%, or about 0.1% to about 1.5%, about 0.2% to about 1%, about 0.3% to about 0.9%, about 0.4% to about 0.8%, or about 0.5% to about 0.7%.

In embodiments using a polysaccharide (e.g., methyl cellulose, carboxymethyl cellulose or other cellulose derivatives, chitosan, or the like), the amount of polysaccharide present may range from about 0 to about 2%, such as about 0.05% to about 1%, or about 0.05% to about 0.5%, or about 0.1% to about 1%, or about 0.4% to about 0.6%.

In embodiments using an essential oil, the amount of the essential oil present may range from about 0 to about 4%, such as about 0.1% to about 2.5%, about 0.2% to about 1.5%, about 0.3% to about 1.5%, about 0.4% to about 1.5%, or about 0.5% to about 1.5%.

In embodiments using a surfactant, the amount of the surfactant can range from about 0.01% to about 100% of the amount of the cellulose nanomaterial used, such as about 0.01% to about 10%, or about 0.01% to about 5%, or about 0.5%, or about 0.05% to about 1%, such as about 0.1% to about 0.5%, or about 0.1% to about 0.2%.

In particular embodiments, the cellulose nanomaterial: surfactant ratio can range from 1:1 to 20:1, such as 2.5:1 to 20:1, or 2.5:1 to 10:1. In embodiments using an antimicrobial, the amount of the antimicrobial can range from about 0.1% to about 1%, such as about 0.1% to about 0.75%, or about 0.1% to about 0.5%, with exemplary embodiments using 0.5%.

As will be apparent to those of skill in the art, each of the exemplary coatings described above, as well as other art-recognized coatings appropriate for foodstuffs can be used in preparing the pellets of the invention.

In some embodiments, the pellet (i.e., a fungal pellet as described herein) is coated with a first edible film containing one or more of the coatings. In some embodiments, the pellet is coated with a first edible film and a second edible film, each film containing one or more of the coatings. In some embodiments, the first edible film and the second edible film contain the same coating. In some embodiments, the first edible film and the second edible film contain at least one different material as part of the respective coating.

Pigments

In some embodiments, one or more pigments are included in the composition and such pigments may impart different colors in different layers or patterns to the pellet and/or the coatings (e.g. edible films). The pigment may be natural (e.g., derived from a fruit, vegetable or other natural source), or it can be synthetic (e.g., food coloring).

In an exemplary embodiment, the first edible film is colored or clear. When the first edible film is colored, it may be a different color than fungal pellet at the "core" of the composition or than a subsequent edible film layer (e.g., a second edible film applied to the exterior). In some embodiments, the first edible film and the second edible film may be the same color. In some embodiments, the pellet (the fungal pellet at the core) may be the same color as the first edible film or the second edible film or the same color as both of the first edible film and the second edible film.

In an exemplary embodiment, the pellets display pearlescence to the surface. In this regard, the choice of pearlescent pigment included in the powder mixtures must take into account that the pigment portion should be one meeting or is capable of meeting all government approved requirements for human consumption. In one preferred embodiment of the invention, the pearlescent pigments included are based on titanium dioxide platelets, also known as platy $TiO_2$, such as those available from Engelhard and/or those described in U.S. Pat. Nos. 5,611,851, and 6,627,212, the disclosures of which are incorporated herein by reference. In some embodiments, a pearlescent pigment is incorporated into the fungal pellet, the first edible film, the second edible film or any combination thereof.

A non-limiting list of suitable pearlescent platy $TiO_2$ pigments include green, blue, violet, red, gold, orange, and pearl. In an alternative aspect of this embodiment, the pearlescent pigment is a micaceous pearlescent pigment such as those containing mica coated with titanium dioxide, iron oxide, etc., combinations thereof and the like. Exemplary pearlescent pigments are those available under the trade name Candurin® from Merck KGaA, as mentioned above. See also PCT publication number WO 00/03609, the disclosure of which is incorporated herein by reference. A non-limiting list of suitable pearlescent pigment products include Candurin silver fine, silver sheen, silver luster and sparkle silvers, etc. various sugar products like banana sugar or others having a white color and gold, red or blue highlights. Still others include those having various colors, e.g. reds, bronzes, coppers having glitter or luster finishes. The only limitation on the pearlescent pigments included in the powders and other formulations described herein is that they must be capable of being substantially homogeneously combined with the other ingredients and that they must be capable of providing a high pearlescent finished coating on the coated article without substantially negatively effecting the organoleptic qualities of the finished product.

In an exemplary embodiment, the pellet include a gloss enhancer. Exemplary gloss enhancers include maltodextrin, dextrose and combinations thereof. The amount of maltodextrin is broadly from about 1 to about 35% by weight, preferably from about 5 to about 25% and more preferably from about 10 to about 20% by weight. Similarly, the amount of dextrose can range from about 1 to about 45% by weight. Preferably, it ranges from about 10 to about 35% and more preferably from about 15 to about 30% by weight. In some embodiments, a gloss enhancer is incorporated into the fungal pellet, the first edible film, the second edible film or any combination thereof.

U.S. Pat. No. 3,981,984 discloses a pigment suspension for a film coating for tablets and the like comprising a solvent, pigment particles dispersed in the solvent, and a low molecular weight alcohol soluble polymer which acts as a protective colloid coating the pigment particles and providing for a higher concentration of pigment particles in the pigment suspension. The method of making the pigment suspension comprises the steps of pouring a solvent into a container, stirring the pigment particles into the solvent to disperse the pigment particles evenly, stirring a protective colloid into the liquid in the container and dispersing it therethrough to make the liquid less viscous and more adaptable for accepting additional pigment particles, and stirring additional pigment particles into the container liquid to obtain the desired pigment suspension. A coating suspension for tablets and the like comprising the pigment suspension dispersed in a polymer solution. The method of making the coating suspension includes dispersing a powdered polymer in a first liquid solvent, stirring a second solvent into the liquid until all of the polymer is in solution, and stirring the pigment suspension into the polymer solution. In an exemplary embodiment, the invention provides a pellet having as the coating material in a thin film comprising a polymer having pigment particles dispersed therethrough, and a protective colloid coating the pigment particles.

As will be apparent to those of skill in the art, each of the pigments set forth above, and other art-recognized pigments appropriate for foodstuffs can be incorporated into the pellets, including the fungal pellet core, one or more edible films surrounding the fungal pellet or any combination thereof.

B. Methods for Making Coated Pellets

In various embodiments, provided herein are methods of forming a coated fungal pellet. In an exemplary embodiment, fungus is incubated (grown) in a nutrient medium (broth) for a first pre-determined time period. Following this time period, the resulting pellet is removed from the broth and may be submitted to a coating step in which a first edible film coats the fungal pellet. In some embodiments, essentially the entire pellet is coated with the first edible film. In some embodiments, a portion of the exterior of the fungal pellet is coated with the edible film. In some embodiments, the coated pellet is then optionally resubmitted to culture a second culture step by placing the coated pellet in a nutrient medium whereby the fungus from the fungal pellet invades or grows through the first edible film of the coated pellet such that the fungus extends through the first edible film or a portion thereof. In some aspects, the fungus extends through the first edible film thereby coating essentially the entire edible film. In some aspects, the fungus extends through the first edible film and coats or extends through a portion of the first edible film.

In some embodiments, the method further comprises subjecting the coated pellet having the fungus extending through the first edible film to a second edible film such that the second edible film is exterior to the first edible film and to the fungus extending through the first edible film. In some embodiments, the method further comprises a step of inactivating the fungus prior to the step of coating with the second edible film. In some embodiments, the method further comprises a step of inactivating the fungus after the step of coating with the second edible film.

Figure 6A:
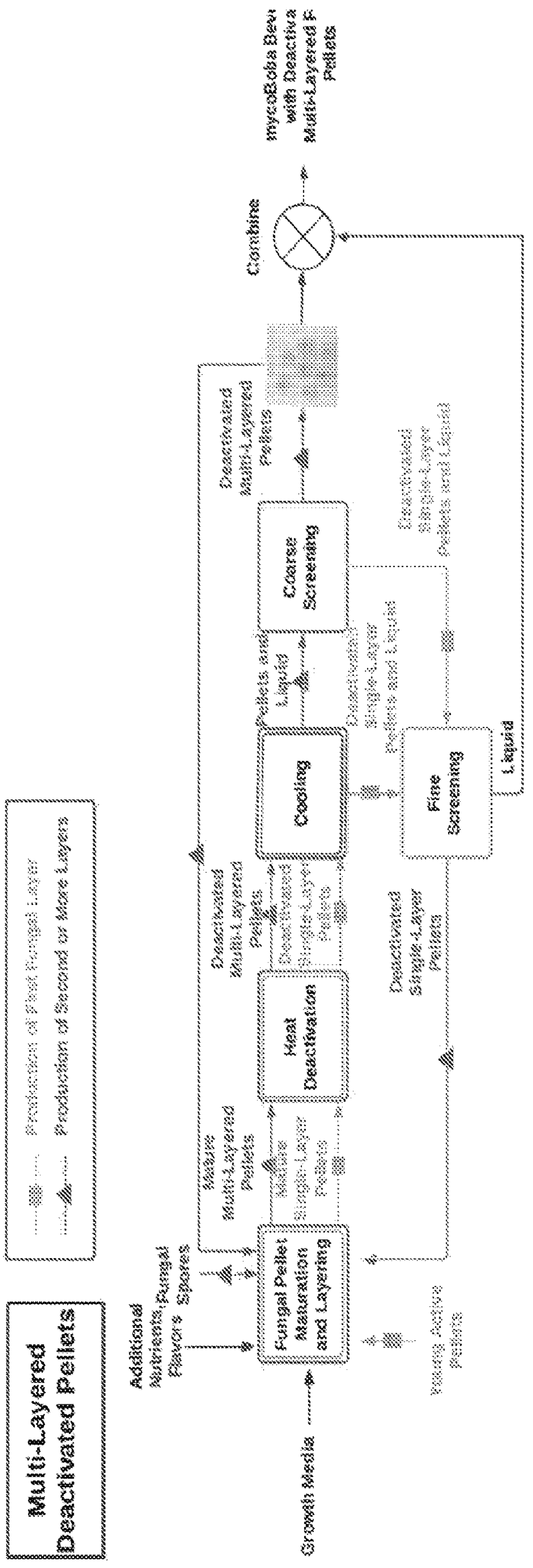
FIG. 6A Deactivated, FIG. 6B Live.
Figure 6B:
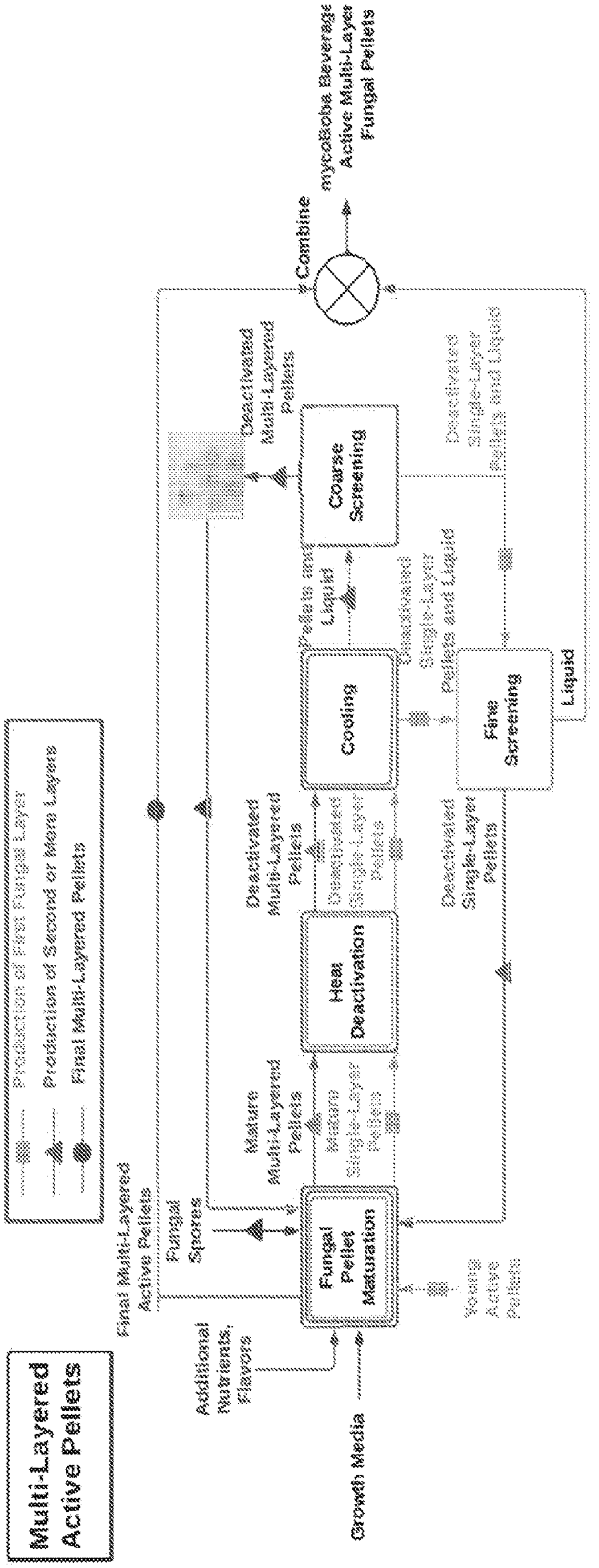
FIG. 6. Process flow diagram for the production of "mycoBoba" beverage with multi-layered fungal pellets.

FIG. 6 and FIG. 7 provide four exemplary methods for producing coated pellets that can be used, for example, in beverage products: (1) Liquid with multi-layered deactivated fungal pellets (FIG. 6A), (2) Liquid with multi-layered active fungal pellets (FIG. 6B), (3) Liquid with coated and active fungal pellets (FIG. 7A), and (4) Liquid with coated and deactivated fungal pellets (FIG. 7B). The liquid can be fermented to produce beverages with alcohols and other biomolecules or not, depending on if aeration is provided to the reactors.

In an exemplary embodiment, provided herein are methods of preparing a coated pellet of an edible filamentous fungus, such as an *Aspergillus* sp., e.g., *A. awamori*, comprising: (a) culturing the fungus in a nutrient medium for a first pre-selected time period; (b) contacting the fungal pellet, such as a pellet of *Aspergillus* sp., e.g., *A. awamori* from (b) with a precursor (the coating material) for the first edible film for a pre-selected time period, coating, and in some aspects, essentially completely coating, the pellet with the first edible film.

In various embodiments, the method of the invention further comprises: (c), between (a) and (b) terminating (inactivating) the culture of the fungus such that the fungus can no longer grow.

In other embodiments, the method of the invention includes: (d), following (b), submitting the pellet of (b) to a second culturing (re-culturing) of the fungal pellet in a nutrient medium for a second pre-selected time period such that the fungus grows and extends through the first edible film, in some aspects, essentially completely coating the first edible film with the fungus.

In some embodiments, the method further comprises terminating (inactivating) the culture of the fungus after step (d), such that the fungus can no longer grow.

In certain embodiments, provided herein are methods of preparing a coated pellet comprising: (a) culturing the fungus culture in a nutrient medium for a first pre-selected time period; (b) contacting the fungal pellets formed from the culturing with a precursor (coating material) for the first edible film for a pre-selected time period, essentially completely coating the first culture with the first edible film; and (c) during the coating, following the coating or a combination thereof, continuing the culturing of the fungus.

In some embodiments, the edible filamentous fungus of use in the methods of making coated pellets described herein is an *Aspergillus* sp., *Penicillium* sp., *Agaricus* sp., *Amanita* sp., *Armillaria* sp., *Auricularia, Boletus* sp., *Bovista, Calbovista* sp., *Calvatia* sp., *Cantharellus* sp., *Chlorophyllum* sp., *Clitocybe* sp., *Clitopilus* sp., *Coprinus* sp., *Cortinarius* sp., *Craterellus* sp., *Entoloma* sp., *Flammulina* sp., *Fusarium* sp., *Gomphus* sp., *Grifola* sp., *Polypilus* sp., *Gyromitra* sp., *Helvella* sp., *Hericium* sp., *Hydnum* sp., *Hygrophorus* sp., *Lactarius* sp., *Leccinum* sp., *Lentinus* sp., *Lepiota* sp., *Chlorophyllum* sp., *Lepiota* sp., *Lepista* sp., *Clitocybe* sp., *Lycoperdon* sp., *Marasmius* sp., *Morchella* sp., *Phlogiotis* sp., *Pholiota* sp., *Pleurocybella* sp., *Pleurotus* sp., *Pluteus* sp., *Polypilus* sp., *Grifola* sp., *Polyozellus* sp.,

*Polyporus* sp., *Ramaria* sp., *Rozites* sp., *Russula* sp., *Sparassis* sp., *Strobilomyces* sp., *Stropharia* sp., *Suillus* sp., *Terfezia* sp., *Tremella* sp., *Tricholoma* sp., *Tuber* sp., *Volvariella* sp., *Rhizopus* sp., or a combination thereof. In some embodiments, the edible filamentous fungus for use in the methods of making coated pellets described herein is an *Aspergillus* species selected from the group consisting of *Aspergillus oryzae, Aspergillus sojae, Aspergillus kawachii, Aspergillus shirousamii, Aspergillus awamori*, and a combination thereof. In some embodiments, the edible filamentous fungus for use in the methods of making coated pellets described herein is a *Penicillium* species selected from the group consisting of *Penicillium roseopurpureum, Penicillium, camemberti, Penicillium roqueforti, Penicillium chrysogenum, Penicillium roqueforti, Penicillium commune*, and a combination thereof. In some embodiments of the methods, the edible filamentous fungus is an edible *Aspergillus*, sp., an edible *Penicillium* sp., an edible *Auriculariales* sp., or a combination thereof. In some embodiments of the methods, the edible filamentous fungus is *Auriculariales auricula-judae*. In some embodiments of the methods, the edible filamentous fungus is *Aspergillus oryzae*. In some embodiments of the methods, the edible filamentous fungus is *Penicillium roseopurpureum* or *Penicillium commune*, or a combination thereof.

In some embodiments of the methods for making coated pellets, the coating material for use in the first edible film, the second edible film or both the first edible film and the second edible film is pullulan, alginate, cross-linked alginate, sodium alginate, propylene glycol alginate, pectin amylopectin, methoxyl pectin, inulin, carrageenan, cellulose gum, xanthan gum, locust bean gum, gellan gum, guar gum, tara gum, konjac gum, poly(styrenesulfonate), polyglutamic acid, alginic acid, poly(acrylic acid), poly(aspartic acid), poly(glutaric acid), dextransulfate, carboxymethylcellulose, modified carboxymethylcellulose, hyaluronic acid, chondroitin sulfate, heparin, methylcellulose, hydroxypropylmethyl cellulose, hydroxypropyl cellulose, polyvinyl pyrrolidone, maltodextrin, polydextrose, modified starch, tragacanth, gum acacia, modified gum acacia, xanthan gum alginate, agarose, gelatin, gelatin B, inulin, chitin, chitosan or a combination thereof. In some embodiments of the methods for making coated pellets, the coating material for use in the first edible film, the second edible film or both the first edible film and the second edible film is agar, alginate, gelatin, or a combination thereof.

In some embodiments, the method further comprises the addition of a flavor component, a color component, a vitamin, a nutritional mineral, an amino acid, branched chain amino acid, or any combination thereof to one or more of the fungal pellet, the first edible coating, the second edible coating. In an exemplary embodiment, the selected additive(s) is/are not found in the medium used to culture the fungus. A flavor component is a component rendering the composition palatable to a human consumer. A vitamin, nutritional mineral or amino acid is one essential or beneficial to human health and it is provided in a concentration appropriate therefor.

In various embodiments, the method further comprises incorporating a bioactive agent into the pellet. The bioactive agent is incorporated into the fungal culture or into the edible film components, or both, of the pellet. Exemplary bioactive agents include vitamins, minerals, probiotics nutriceuticals and pharmaceuticals. In an exemplary embodiment, the bioactive agent is an agent approved by a regulatory body for use in a human. In an exemplary embodiment, the bioactive agent is a pharmaceutical agent approved by FDA and/or EMA for use in humans.

In an exemplary embodiment, the invention provides a method of improving the palatability of a bioactive agent, e.g., a fungal protein. The method comprises incorporating the bioactive agent into a pellet of the invention. In various embodiments, the pellet is produced by a method set forth hereinabove.

Food and Beverage Products

In an exemplary embodiment, the invention provides processes to simultaneously produce edible fungal biomass and liquid products. The invention comprises methods to create fungal biomass with desired shape, color, texture, density, and flavor characteristics while simultaneously producing a liquid product with desired nutrient, acid, alcohol, antioxidant, and other physical and chemical characteristics.

In some embodiments, the coated fungal pellets described herein are comprised in an edible product such as a food or beverage. In an exemplary embodiment, the food or beverage is intended for consumption by a human and is composed of GRAS components. The food or beverage can include one or more additive, e.g., a color, a flavor, an antioxidant, a vitamin, a nutritional mineral, a preservative, an emulsifier, a salt, a saccharide, a sweetener, and the like.

In various embodiments, the product is a beverage in which the coated fungal pellets are suspended in a liquid carrier. In an exemplary embodiment, the beverage is provided in a sealed container containing one or more than one serving size. In various embodiments, a serving size is about 6 ounces, about 12 ounces, about 16 ounces or about 20 ounces. The liquid carrier of a beverage can be carbonated or flat. The carrier can include a natural or artificial sweetener, a flavor, or a flavor masking element masking an off-flavor. Exemplary liquid carriers include water, carbonated water, tea, milk, fruit juice, coffee, and soda. In some embodiments, the coated fungal pellets in a liquid carrier are a boba-like beverage. In some aspects, the boba-like beverage includes coated fungal pellets with one or more colors or one or more flavors.

The fungal pellets in an edible product, e.g., a food or beverage, may include an active culture, or the pellets or entire product can be treated to inactivate the fungus, such as by pasteurization. In various embodiments, the product is a functional food. In an exemplary embodiment, the functional food has probiotic and/or prebiotic characteristics. In an exemplary functional food of the invention, the probiotic and/or prebiotic characteristics are imparted to the functional food by the fungus in the coated pellets and/or the coating (edible film) of the coated pellets.

In some embodiments, the coated fungal pellets are comprised in a liquid beverage. In some aspects, the beverage is a boba-like product. In some aspects, the coated fungal pellets impart one or more texture characteristics to the boba such as mouthfeel, texture, springiness, snap, resilience, hardness, softness, chewiness and any combination thereof.

EXEMPLARY EMBODIMENTS

Embodiment 1. A pellet comprising a first culture of *A. awamori*, and a first edible film essentially completely coating the first culture of *A. awamori*.

Embodiment 2. The pellet according to embodiment 1, wherein the first edible film is essentially completely coated with a second *A. awamori* culture.

Embodiment 3A. The pellet according to embodiment 2, wherein the second *A. awamori* culture is essentially completely coated with a second edible film.

Embodiment 3B. The pellet according to embodiment 1, wherein a member selected from the first *A. awamori* culture, the first edible coating and a combination thereof comprises a member selected from a flavor component, a color component, a vitamin, a nutritional mineral and a combination thereof.

Embodiment 4. The pellet according to embodiment 2 or embodiment 3A, wherein a member selected from the first *A. awamori* culture, the second *A. awamori* culture, the first edible film, the second edible film and a combination thereof comprises a member selected from a flavor component, a color component, a vitamin, a nutritional mineral and a combination thereof.

Embodiment 5. The pellet according to embodiment 1 wherein the pellet is suspended in an edible liquid.

Embodiment 6. The pellet according to embodiment 1, wherein the first culture of *A. awamori* is selected from an active culture and an inactive culture.

Embodiment 7. The pellet according to embodiment 2, wherein a member selected from the first culture of *A. awamori* and the second culture of *A. awamori* and a combination thereof is selected from an active culture, an inactive culture and a combination thereof.

Embodiment 8. A method of preparing a pellet according to embodiment 1 comprising:

(a) culturing the first *A. awamori* culture in a nutrient medium for a first pre-selected time period;

(b) contacting the first *A. awamori* culture from (b) with a precursor for the first edible film for a pre-selected time period, essentially completely coating the first culture with the first edible film.

Embodiment 9. The method according to embodiment 8, further comprising:

(c), between (a) and (b) terminating the culture of the first *A. awamori* culture.

Embodiment 10A. The method according to embodiment 8, further comprising:

(d), following (b), submitting the pellet of (b) to a second culture of *A. awamori* in a nutrient medium for a second pre-selected time period, essentially completely coating the first edible film with the second culture of *A. awamori.*

Embodiment 10B. A method of preparing a pellet according to embodiment 1 comprising:

(a) culturing the first *A. awamori* culture in a nutrient medium for a first pre-selected time period;

(b) contacting the first *A. awamori* culture from (b) with a precursor for the first edible film for a pre-selected time period, essentially completely coating the first culture with the first edible film; and (c) during the coating, following the coating or a combination thereof, continuing the culturing.

Embodiment 11. The method according to embodiment 8 or 10, wherein the nutrient broth comprises an extract of almond hulls or other agricultural products Additional exemplary methods and compositions are set forth in the examples appended hereto.

EXAMPLES

Flavor Extraction and Fungal Cultivation

Figure 8:
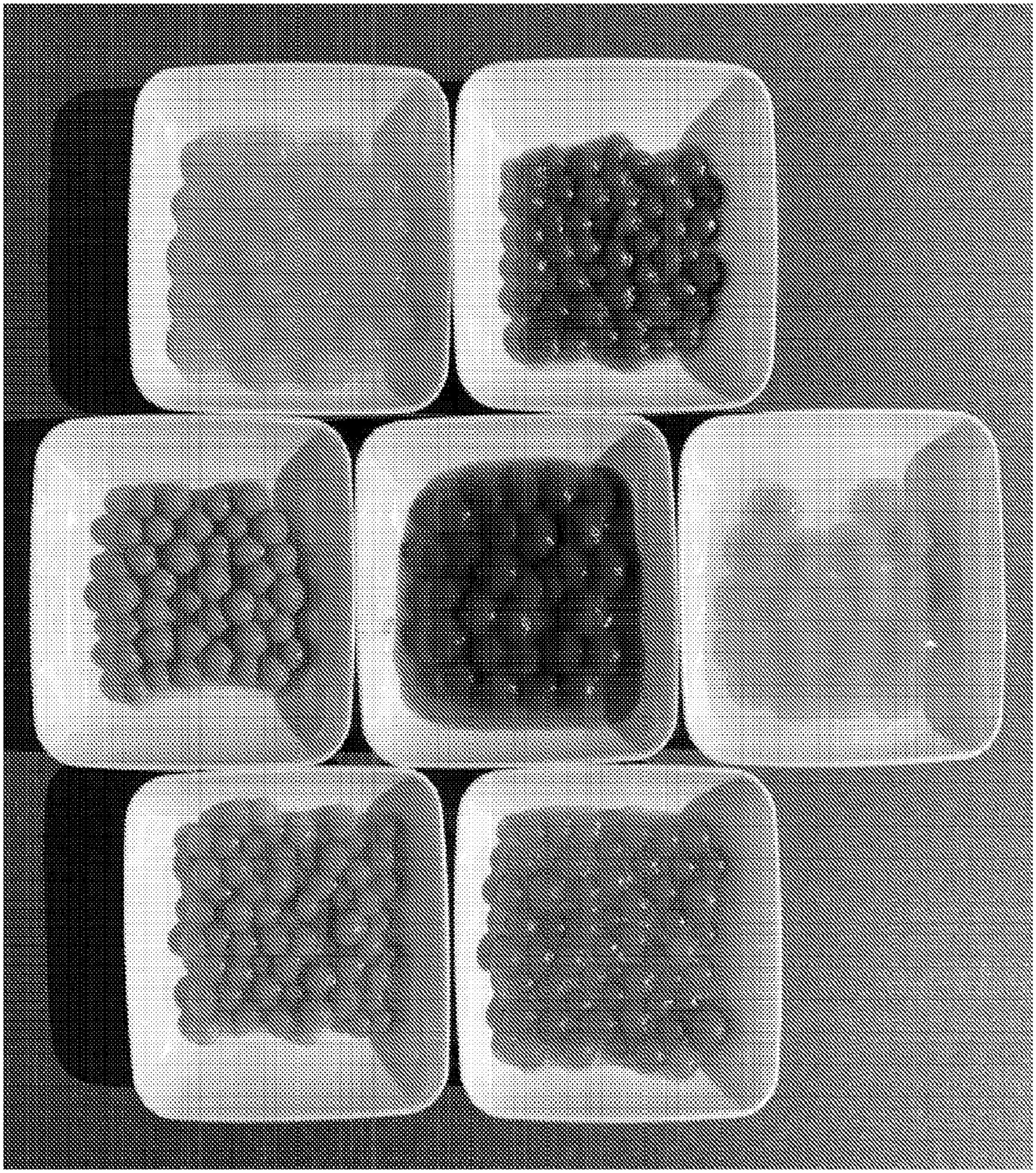
FIG. 8. Harvested fungal pellets with different colors: 1, carrot; 2, coffee; 3, pomegranate peel; 4, red beet; 5, spinach; 6, matcha; 7, blueberry.
Figure 9:
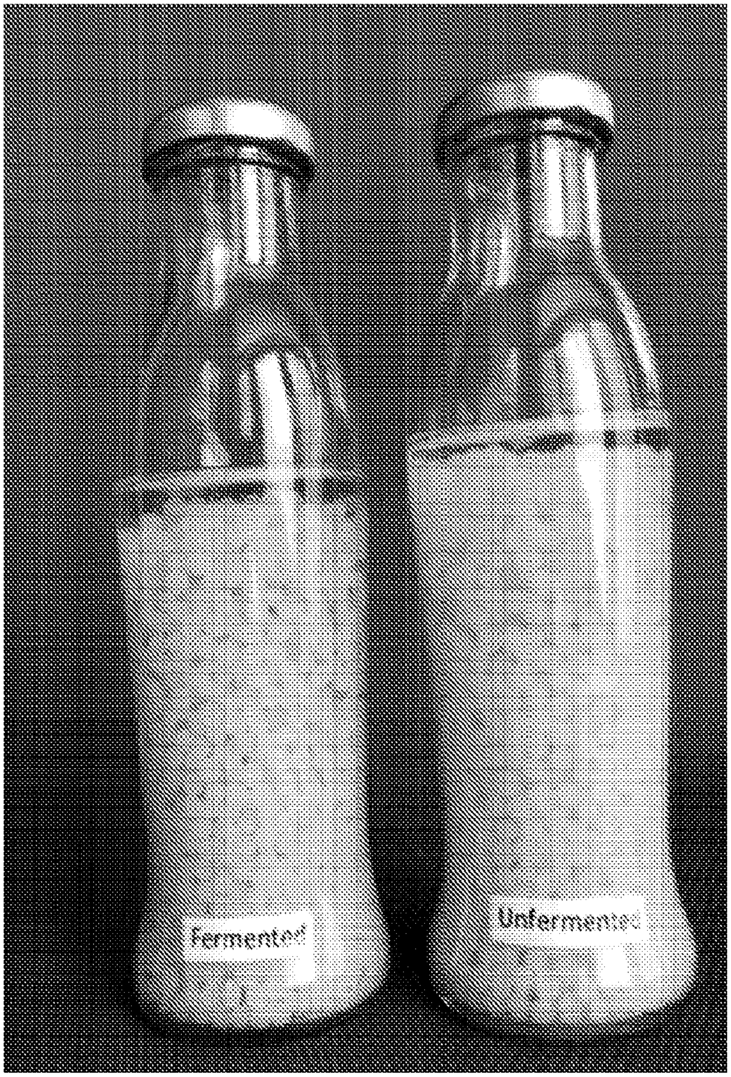
FIG. 9. Fermented (left) and aerated (right) fungal pellets cultivated in potato dextrose broth.

Flavor, nutrient, and color molecules are firstly extracted from fruits, vegetables, or other materials. The liquid is separated from the insoluble materials and additional nutrients, colors, and/or flavors are added to the liquid to support fungal growth and modulate the resulting chemical and physical characteristics of the fungal biomass. The solution is cooled and then inoculated with fungal spores. The solution is agitated continuously with a certain intensity to produce fungal pellets with a certain size, density, color, shape, texture and flavor (FIG. 8). The culture is simultaneously aerated or not, depending on the desired alcohol and organic character that is desired in the final liquid (FIG. 9). During cultivation, the fungi will produce alcohol and/or organic acids (such as citric acid) depending on the dissolved oxygen content in the cultivation media.

Creation of Stabilized Fungal Biomass with Modulated Colors and Flavors

The fungal pellets are optionally separated from the cultivation media following cultivation, dipped in a mixture containing gel-forming polysaccharides (e.g., agar, agarose, gelatin, etc.) and/or additional flavor, color, and nutrient compounds at elevated temperature (45-90° C.) for 1-8 minutes and cooled to simultaneously deactivate the fungal biomass and also form a coating of certain density. The density of the coating is modulated by the operator by the concentration of biomolecules dissolved in the coating liquid. The resulting deactivated or live pellets can be added to liquid consisting of the fungal cultivation media, another liquid, a mixture of liquids, utilized on its own, or further processed (FIGS. 6-7). The biomass may be deactivated so as to not continue the production of unwanted reproductive structures such as sporangia and spores in the final product.

Figure 10A:
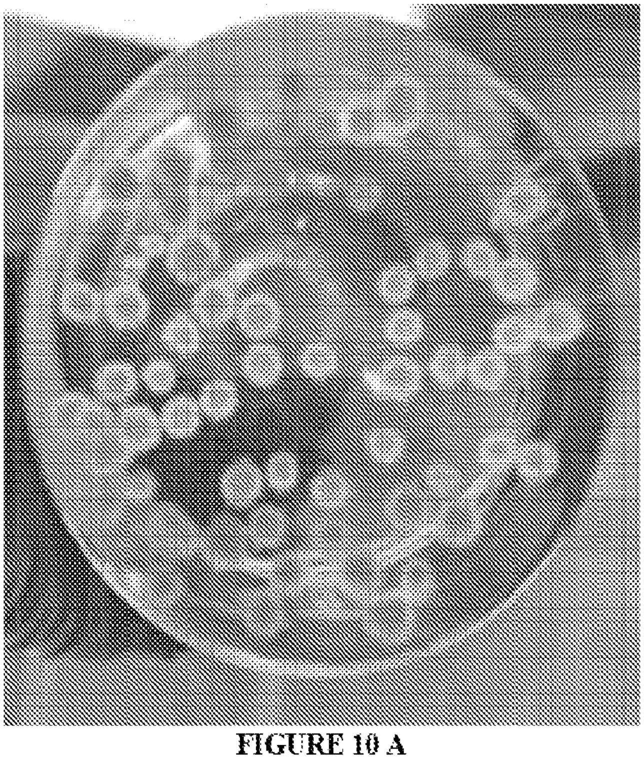
FIG. 10: Multi-colored pellets production: small (FIG. 10A) and large (FIG. 10B) inactive pellets (grew in carrot juice) cultivated in PDB with new spores.
Figure 10B:
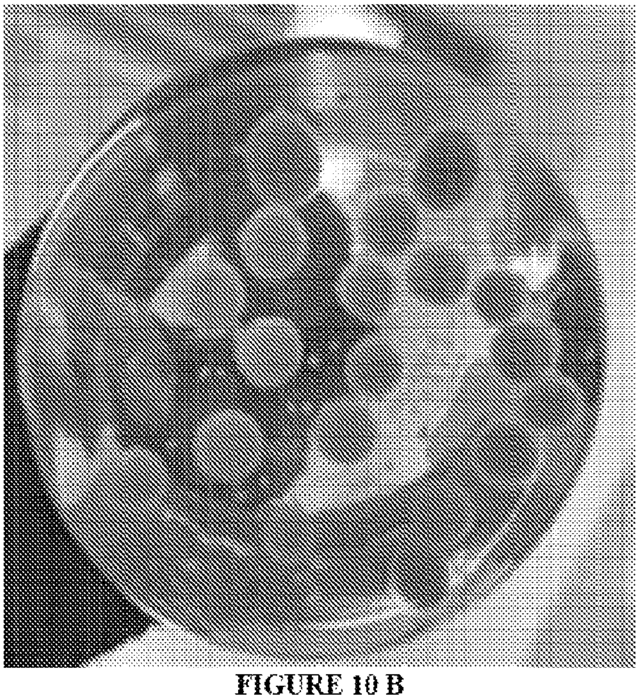
Figure 11A:
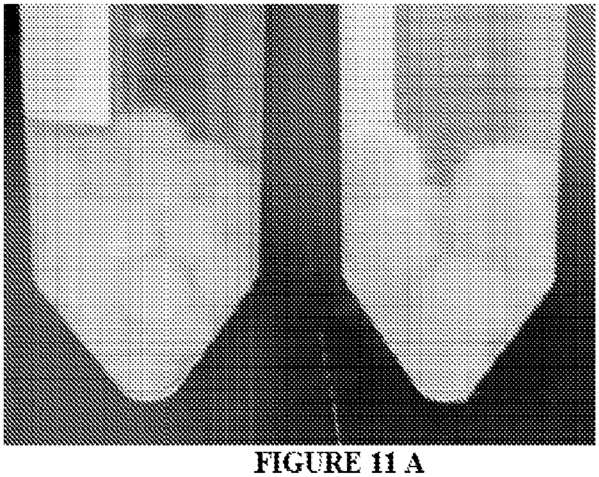
FIG. 11. Multi-colored pellets production: A, small and large inactive pellets after multi-color production; B, C &D Cross section of multi-colored pellets: B, outside: yellow, inside: orange; C, outside: white, inside: orange; D, center: orange, middle: yellow, outside: white.
Figure 11B:
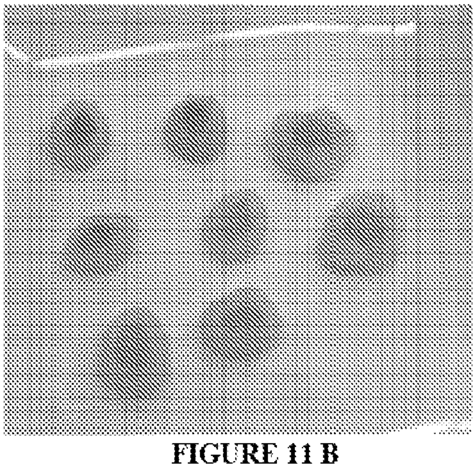
Figure 11C:
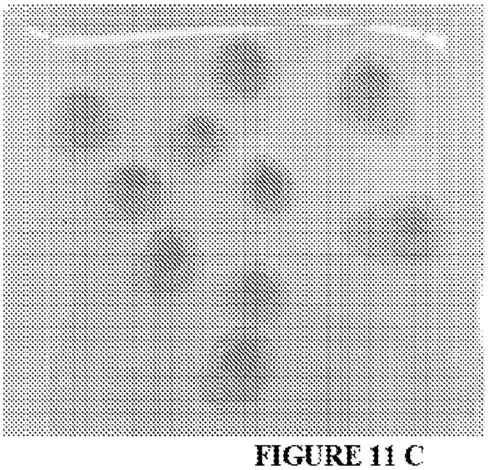
Figure 11D:
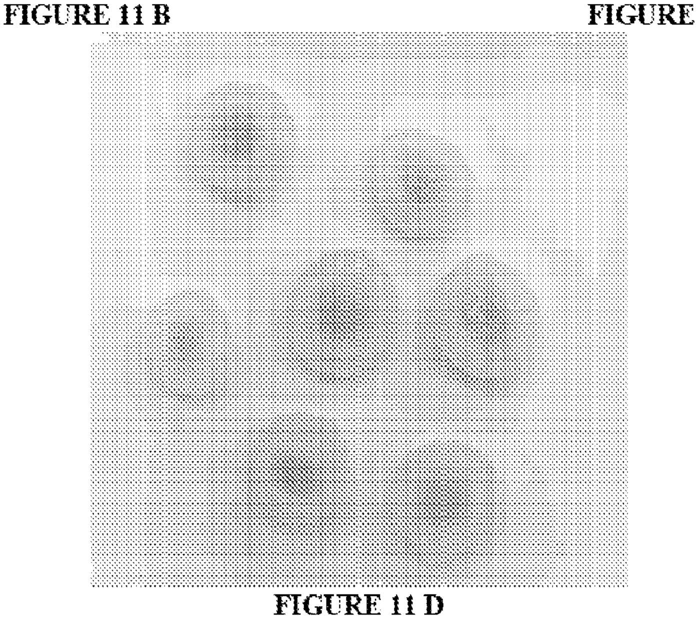
Figure 12A:
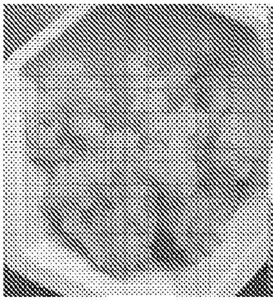
FIG. 12. Harvested fungal pellets with different colors: A, yellow; B, red; C, green; D, blue; E, violet; F, brown.
Figure 12B:
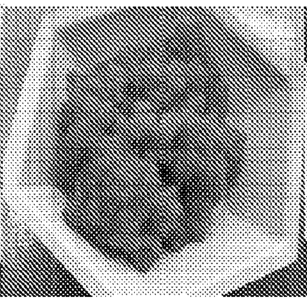
Figure 12C:
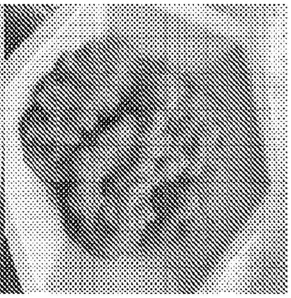
Figure 12D:
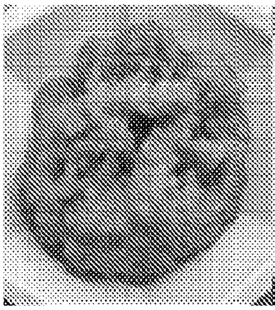
Figure 12E:
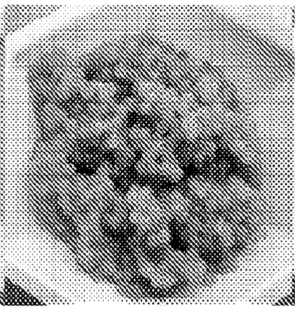
Figure 12F:
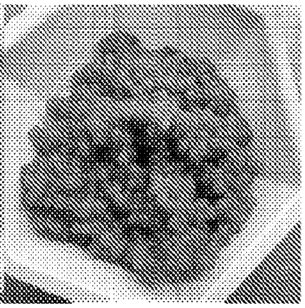

One method of further processing is to include the pellets in another cultivation media with certain characteristics of nutrient, flavors, and colors. Fungal spores are reinoculated to the media to bind and colonize the prior-coated fungal pellet surfaces. The color of the media is modulated to produce new fungal biomass of different or similar character (flavor, color, nutrient, etc.) as the prior-coated fungal biomass. The resulting biomass can therefore consist of layers of multiple colors, flavors, and textures, utilizing the methods previously disclosed in this invention description (FIG. 10 and FIG. 11).

In the following sections, examples of each process are described from data derived in the laboratory setting.

Example 1

Fungal Pellet Cultivation

*Aspergillus awamori* (ATCC 22342) was obtained from the American Type Culture Collection. The fungal spores were maintained on potato dextrose agar (PDA) plates and stored at 4° C. In preparation for inoculation, spores were transferred to a new PDA plate and incubated at 30° C. for three days. After three days, spores were suspended in sterile DI water. The spore concentration of the resulting solution was then determined using a hemocytometer counting chamber with appropriate dilution.

Simple Fungal Pellets

*Aspergillus awamori* was cultivated for 5 days to form pellets using a single step process. The pellets have simple structure and are called “simple” pellets. Potato dextrose broth (PDB, Becton, Dickinson and Company) was used as liquid substrate media for cultivating *Aspergillus awamori*.

Spore solutions were inoculated into 250 mL flasks containing 120 mL of sterilized potato dextrose broth to achieve a final concentration of $1\times10^4$ spores/mL. The flasks were then covered with a mesh stopper to prevent contamination and agitated at 150 rpm at 30° C. on a rotary shaker (Benchmark Incu-Shaker™ Mini, 19 mm orbit). *Aspergillus awamori* was cultivated for 5 days to form and grow pellets.

Example 2

Complex Fungal Pellets

*Aspergillus awamori* was cultivated for 5 days to form pellets using three-step process, which is the newly invented method. The pellets have complex structure and are called "complex" pellets. The three steps used to create the complex fungal pellets are described as follows. *Aspergillus awamori* was first cultivated in Potato dextrose broth for 2 days using the same the substrate media, spore solution and inoculation procedure as those described above. After two days, small pellets of approximately 1.5-3.5 mm were formed. The pellets were separated from the liquid media using cheese cloth. Forty five pellets were placed into a warm (50° C.) and sterilized agar solution (30 g/L) for 5 seconds, removed from the solution and then cooled to room temperature (20-25° C.). The agar-coated pellets were then placed into a flask containing 120 mL of sterilized potato dextrose broth and agitated at 150 rpm at 30° C. on a rotary shaker (Benchmark Incu-Shaker™ Mini, 19 mm orbit) for 3 more days.

Example 3

We developed a 2-step extraction process for the extraction of sugars and antioxidants from almond hulls. In the first step, we used hot water to extract sugar and water-soluble phenolic compounds. Then in the second step, we used 50% ethanol aqueous solution to extract the ethanol-soluble phenolic compounds. The residual solids after the two-step extraction process were mainly fibers. Diluted sulfuric acid was used to hydrolyze the fibers to release more sugars from almond hulls.

The extract after 1$^{st}$ stage extraction was used for the fungal food production without adding any other nutrients. The extract contained sugar, antioxidant and nutrients. We determined the kinetics of the growth of *A. awamori* grew in almond hull extract. The yield of this fungi, the fungal protein and fat content were also analyzed. FIG. 1 shows exemplary processes developed in this project. We also conducted a preliminary economic analysis based on the values of antioxidants and fungal food produced.

Several tasks were performed during this project including: 1) characterization and analysis of almond hulls; 2) sugar and antioxidants extraction from almond hulls; 3) fungal production from almond hull sugar and nutrients; 4) hydrolyze almond hulls with sulfuric acid; and 5) preliminary economic analysis. These tasks are described in detail below.

Characterization and Analysis of Almond Hulls

In order to select a variety of almond hull to work with, we firstly determined sugar and phenolic contents of five different varieties of almond hulls. The Nonpareil, Monterey and Fritz almond hulls were obtained from the almond orchard at Nickels Soil Lab. Independence almond hulls were collected from Cortez Growers Association. And the pollinated almond hulls were obtained from Almond Board of California. Table 1 summarizes the sugar and phenolic compounds of the selected varieties. Independence almond hull is a new variety and has the highest sugar content, 42.23%. Therefore, we decided to use the independence almond hull in the experiments.

TABLE 1

Sugar and phenolic compounds content in different almond hulls

| Variety | Harvest year | Sugar content (%, d.b.) | Phenolic compounds content (tannic acid eqv, % d.b.) |
|---|---|---|---|
| Independence | 2019 | 42.23 | 3.44 |
| Nonpareil | 2019 | 31.84 | 5.45 |
| Fritz | 2019 | 41.65 | 7.60 |
| Monterey | 2019 | 33.11 | 6.76 |
| Pollinated | 2018 | 33.66 | 7.08 |

Independence almond hulls were analyzed for total solids (TS), moisture content (MC), volatile solid (VS) and ash content with results shown in Table 2. The composition of hulls was also analyzed with results shown in Table 3. Most of the sugars in the hulls were fermentable sugars, including 15.3% glucose, 7.7% fructose and 15.5% sucrose. Besides sugars, these hulls had 8.3% cellulose, 4.9% hemicellulose and 5.9% protein.

The TS, moisture content (MC) and VS of the almond hulls are shown in Table 2.

TABLE 2

Characteristics of independence almond hulls

| TS (%, wb[1]) | MC (%, wb) | VS (%, wb) | VS/TS (%) | Ash (%, db[1]) |
|---|---|---|---|---|
| 89.7 | 10.3 | 83.8 | 93.4 | 6.6 |

[1]wb—wet basis, db—dry basis

TABLE 3

Composition (%) of independence almond hulls (dry basis)

| Glucose | Fructose | Sucrose | Sorbitol | Total Nitrogen |
|---|---|---|---|---|
| 15.3 | 7.7 | 15.5 | 2.7 | 0.95 |
| Hemicellulose | Cellulose | Lignin | Protein | Crude Fat |
| 4.9 | 8.3 | 2.8 | 5.9 | 1.69 |

Sugar and Antioxidants Extraction from Almond Hulls

1) Experimental Design and Methods

A two-step extraction process was developed to optimize the extraction of sugar and antioxidants. Table 4 shows the extraction parameters for each step. The parameters including time, temperature and solvent were decided by preliminary experiments (see Appendix A and Appendix B).

Almond hulls (5% loading, g mass/ml 50% ethanol solution, d.b.) were soaked in preheated DI water at 80° C. for 2 hours. After two hours, solid was separated from liquid by vacuum filtration. The liquid was saved for sugar and phenolic compounds measurement. The solids were dried by using vacuum dryer at 40° C. and then subjected to ethanol-assisted extraction. Almond hulls (5% loading, g mass/ml 50% ethanol solution, d.b.) were soaked in 50% ethanol at 50° C. for 2 hours. The solids were separated by using vacuum filtration and then dried by using vacuum drying at 40-45° C. and saved for acid hydrolysis. Sugar and phenolic compounds concentrations in the liquid were measured.

Total reducing sugar concentration and total phenolic concentration were measured by the same methods as mentioned in Appendix A.

TABLE 4

| Parameters used for two-step extraction | | |
|---|---|---|
| 1st extraction | 2nd extraction | Responses |
| Solvent: DI water<br>TS loading (w/w): 5%<br>Temperature: 80° C.<br>Time: 2 h | Solvent: 50% ethanol<br>TS loading (w/w): 5%<br>Temperature: 50° C.<br>Time: 2 h | Total reducing sugar concentration<br>Total phenolic concentration |

2) Results

The extracted sugars and antioxidants from the two-step extraction process are shown in Table 5. As can be seen, each 100 gram dry almond hulls could produce 46 gram sugars and 3.4 gram phenolic compounds.

TABLE 5

Extracted sugars and antioxidants from a two-step water and ethanol-extraction process (%, g/g initial almond hull, d.b.)

| Step | Solvent | Temperature (° C.) | Extracted sugars (% d.b.) | Extracted phenolic compounds (d.b.) |
|---|---|---|---|---|
| 1st | DI water | 80 | 41.54 | 2.24 |
| 2nd | 50% ethanol | 50 | 4.59 | 1.2 |
| Total | — | — | 46.13 | 3.44 |

4.3 Fungal Biomass Production from Almond Hull Sugar and Nutrients

Before determining the kinetics of the fungal growth in almond hull, we did preliminary experiments by comparing fungal growth morphology, sugar consumption rate and fungal protein content in almond hull with two commercial media, potato dextrose broth (PDB) and Czapek's media. These preliminary experiments showed that almond hull extracts containing sugar and nutrients was better for *A. awamori* to grow than the other two commercial media. (see Appendix C) Then we started producing fungal biomass as following:

1) Experimental Design and Methods

We designed an experiment to analyze the growth kinetics of *A. awamori* to determine how well and how fast this fungus can grow in the almond hull extracts. The experimental design is listed in Table 6.

TABLE 6

| Experimental design | | |
|---|---|---|
| Fixed parameters | Variables | Responses |
| Usable sugar concentration: 17.9 g/L<br>Strain: *Aspergillus awamori*<br>Initial pH: 4.95<br>Inoculum level: $10^4$ spores/ml<br>Cultivation conditions: 30° C., 150 rpm, 12 days | Time: 0 day, 4 days and 8 days | Total reducing sugar concentration<br>Glucose concentration<br>pH<br>Dissolved oxygen<br>Total Kjeldahl Nitrogen (TKN)<br>Phosphate<br>Sulfur<br>Total suspended solid (TSS)<br>Volatile suspended solid (VSS)<br>Protein content |

2) Results

Figure 2:
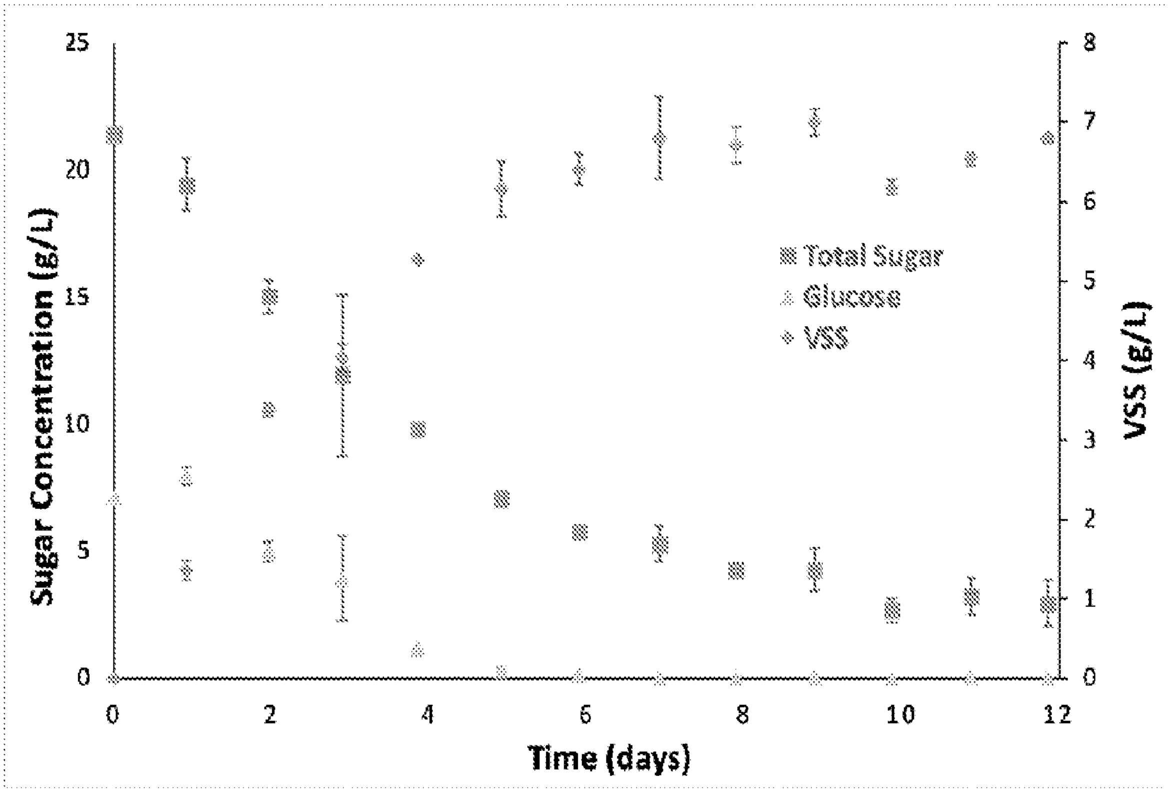
FIG. 2. *A. awamori* growth curve in almond hull liquid.

The growth curve of the *A. awamori* on almond hull extract is shown in FIG. 2. The fungi reached exponential phase on the 2nd day and entered stationary phase on the 5th day. The specific growth rate during exponential phase was determined to be 0.21 $d^{-1}$.

The concentration of different nutrients during the cultivation of the fungi is shown in Table 7. As can be seen, nutrients sufficient for the fungal growth during different growth phase. Only sugar was the limiting factor for fungal growth. Glucose was totally consumed by the fungi within 5 days. After 8 days, there was a small amount of residual sugar, indicating that some of the sugars couldn't be utilized by the fungi.

TABLE 7

Almond hull liquid extract characteristics during *A. awamori* growth

| | 0-day | 4-day | 8-day |
|---|---|---|---|
| pH | 4.95 | 3.21 | 2.92 |
| Dissolved oxygen (mg/L) | 5.80 | 2.45 | 3.80 |
| Sugar (g/L) | 31.38 | 9.81 | 4.29 |
| TKN (mg/L) | 364 | 196 | 182 |
| P (mg/L) | 186.00 | 128.64 | 87.52 |
| S (mg/L) | 154.33 | 143.46 | — |

Table 8 shows some fungal growth characteristics in almond hull extract at 4th and 8th day. The total biomass concentration on 8th day was higher than on 4th day. However, the biomass yield was lower on 8th day higher. This might be due to cell lysis during the stationary phase.

TABLE 8

*A. awamori* growth characteristics in almond hull liquid

| | 4-day | 8-day |
|---|---|---|
| Consumed sugar (g/L) | 11.57 | 17.12 |
| TSS (g/L) | 5.76 | 7.28 |
| VSS (g/L) | 5.27 | 6.72 |
| VSS/TSS (%) | 91.7 | 92.3 |
| Biomass yield (g VSS/g sugar) | 0.456 | 0.393 |

The protein content of *A. awamori* harvested after 4 days was measured to be 23.8%. So, the protein yield based on sugar consumption (g protein/g sugar) was 11.8%.

Hydrolyze Almond Hulls with Sulfuric Acid

In order to release more sugars from almond hulls, we used sulfuric acid to hydrolyze the cellulose and hemicellulose of almond hulls. There are many different methods to hydrolyze the cellulose and hemicellulose, including chemical hydrolysis, enzyme hydrolysis and thermal hydrolysis. Acid hydrolysis has higher efficiency and lower cost than enzyme hydrolysis and uses less energy than thermal hydrolysis. Moreover, based on our preliminary results, *A. awamori* could grow well at pH 2. This means that there is no need for adjusting pH to higher values after acid hydrolysis for fungal cultivation.

1) Experimental Design and Methods

Dried fibers collected after 2-step sugar and antioxidants extraction were hydrolyzed using dilute sulfuric acid. Central composite response surface experimental design method was applied to determine the effect of different temperatures (30'C., 60° C. and 90° C.), different acid concentrations (5%, 10% and 15%) and different reaction times (1 h, 2 h and 3 h) on sugar yield. The experimental design is shown in Table 9.

After hydrolysis, the sugar concentrations were measured to calculate the hydrolysis efficiency. Sugar concentrations were measured by the same method as Appendix A.

The hydrolysis efficiency was calculated as follows:

$$\frac{\text{sugar concentration (g/ml) after acid hydrolysis} * \text{liquid volume (ml)}}{\text{dried mass of almond hull before two-step extraction } (g)}$$

Experimental data were fitted to the following response surface model using R software:

$$Y=b_0+b_1t+b_3T+b_3C+b_{12}fT+b_{13}tC+b_{23}TC+b_{11}t^2+b_{22}T^2+b33C^2$$

(Y: sugar yield, t: time; T: temperature; C: sulfuric acid concentration).

TABLE 9

Experimental design of sulfuric acid hydrolysis

| Fixed parameters | Variables | Responses |
|---|---|---|
| Fibrous solid: 0.5 g<br>Acid: sulfuric acid<br>Acid volume: 5 ml | Temperature: 30 °C, 60 °C and 90 °C<br>Time: 1 h, 2 h and 3 h<br>Sulfuric acid concentration (w/w): 5%, 10% and 15% | Total reducing sugar concentration |

2) Results

The efficiency of acid hydrolysis of almond hulls are shown in Table 10. As can be seen, more sugars were produced at high temperature and high sulfuric acid concentration. From each 100 gram of dry almond hulls, 17 grams of extra sugars were released by using 15% sulfuric acid at for 3 hours.

The response function model for hydrolysis efficiency were found as follows:

$$Y=(8.621+1.183t+6.417T+0.329C-0.272tT-0.005tC+0.148Tc+0.557t^2)/100$$

Y: sugar yield, lb sugar/lb hulls; t: time, h; T: temperature, C: sulfuric acid content, %

According to this model, we found that temperature was the most significant parameter for acid hydrolysis.

TABLE 10

Hydrolysis efficiency (%) of sulfuric acid hydrolysis of almond hull fibers

| No. | T (h) | T (° C.) | $H_2SO_4$ (%) | Hydrolysis efficiency (lb sugar/lb hulls, dry basis) |
|---|---|---|---|---|
| Blank 1 | 1 | 30 | 0 | 0.0194 |
| 1 | 1 | 30 | 5 | 0.0104 |
| 2 | 1 | 30 | 15 | 0.0157 |
| Blank 2 | 1 | 90 | 0 | 0.0238 |
| 3 | 1 | 90 | 5 | 0.1428 |
| 4 | 1 | 90 | 15 | 0.1509 |
| Blank 3 | 3 | 30 | 0 | 0.0242 |
| 5 | 3 | 30 | 5 | 0.0412 |
| 6 | 3 | 30 | 15 | 0.0431 |
| Blank 4 | 3 | 90 | 0 | 0.0284 |
| 7 | 3 | 90 | 5 | 0.1596 |
| 8 | 3 | 90 | 15 | 0.1706 |
| Blank 5 | 2 | 60 | 0 | 0.0225 |
| 9 | 2 | 60 | 10 | 0.087 |
| 10 | 2 | 60 | 10 | 0.0833 |
| 11 | 2 | 60 | 10 | 0.0843 |
| 12 | 2 | 60 | 10 | 0.0902 |

Example 4

Effects of Solvent on Phenolic Compounds and Sugar Extraction from Almond Hulls

1) Experimental Design and Methods

The experimental design is listed in Table 11. The almond hulls were ground and passed through a 0.5 mm sieve and 1 g (db) of sample was weighted into a 50 ml falcon tube. For phenolic compounds extraction, 20 ml of different solvents were added to the 50 ml falcon tube and mixed with ground almond hulls to investigate the effect of solvent on phenolic compounds extraction. The extraction process was carried out for 90 min at 30° C. and 200 rpm. After extraction, the 50 ml falcon tube was centrifuged at 8000 rpm for 15 min, and the supernatant was collected for total phenolic, total sugar and antioxidant activity assays.

TABLE 11

Experimental design

| Fixed parameters | Variables | Responses |
|---|---|---|
| Sample mass: 1 g (db)<br>Sample size: <0.5 mm<br>Solid/Solvent: 1:20 (w/v)<br>Extraction condition:<br>30 °C, 200 rpm, 90 min | Solvent:<br>DI water<br>Methanol (100%, 75% and 50%)<br>Ethanol (100%, 75% and 50%) | Total phenolic concentration<br>Total reducing sugar concentration<br>DPPH[1] radical scavenging ability |

[1]DPPH-2,2-diphenyl-1-picrylhydrazyl

Total phenolic concentrations in the supernatant were measured by Folin-Ciocalteau method. 0.5 ml of supernatant was mixed with 2.5 ml of ten-fold diluted Folin-Ciocalteau reagent. After 5 min, 2 ml of 7.5% sodium carbonate was added. The reaction was allowed to proceed at 45° C. After 15 min, the absorbance was measured at 765 nm. A mixture of DI water and Folin-Ciocalteau was used as blank. The standard curve was plotted with 0, 50, 100, 150 and 250 mg/L tannic acid solution. The concentration and content of phenolics were expressed as tannic acid equivalents.

Total reducing sugar concentration in the supernatant were also measured to determine how much sugar was extracted along with phenolics. The DNS (3,5-Dinitrosalicylic acid) method was applied to measure the total reducing sugar extracted. 1 ml DNS solution was mixed with 0.1 ml 20 times diluted supernatant. The reaction was allowed to process at 100° C. for 10 min and then at 0° C. for 10 min. Before measuring the absorbance at 540 nm, 1 ml of DI water was added to stop the reaction. The standard curve was plotted with 0, 0.5, 1, 2, 2.5 and 5 g/L glucose. DI water was used as blank.

Antioxidant activities of the almond hull extracts were performed by DPPH radical-scavenging assay. All supernatants were diluted into 5 different concentrations with coordinate solvents which are used for phenolics extraction. DPPH powder was dissolved in methanol to make a ml $1\times10^{-4}$ M DPPH solution. 0.2 ml of each diluted solution was mixed with 2 ml DPPH solution and then incubated at room temperature for 2 h. A control mixture was made by adding 0.2 ml methanol into 2 ml DPPH solution. After 2 h incubation, the absorbance of reaction mixture was measured at 515 nm. The radical scavenging activities (RSA) was calculated as follows:

$$RSA\ (\%) = \frac{\text{Abscontrol} - \text{Abssample}}{\text{Abscontrol}} \times 100\%$$

In order to compare the antioxidant activities between different samples, we calculated $IC_{50}$ for each sample, which is the phenolic concentration required to remove 50% of the original DPPH radical concentration. $IC_{50}$ was obtained by plotting the RSA of the 5 diluted samples against their respective concentrations in the reaction mixture into a dose response curve.

The concentration of phenolics in the reaction mixture was calculated as follows:

$$\text{Phenolics concentration (mg/L)} = \frac{\text{Initial phenolic concentration}}{\text{Dilution factor}} \times$$

-continued $$\frac{0.2\text{ ml diluted sample}}{0.2\text{ ml diluted sample} + 2\text{ ml DPPH solution}} \times 10^6$$

2) Results

Table 12 summarizes the results of the total phenolic compounds concentrations, total sugar concentrations and antioxidant activities extracted by different solvent. Pure methanol was the best extraction agent for phenolic compounds compared with pure water and pure ethanol. However, 50% ethanol was the best one among all the selected solvents. Phenolic compounds extracted by 50% ethanol had the lowest $IC_{50}$, which means these phenolic compounds has the highest antioxidant activities. Sugars were hardly dissolved in pure methanol and alcohol compared with water, but most of the sugars were extracted by 50% ethanol solution, which accounted for 32% of the total mass of dried almond hulls. According to preliminary experiments, the total sugar content in these almond hulls was 41.4%, that means 77% of sugars were extracted in this experiment. These would make the later sugar extraction process much easier but bring up the problem to separate phenolic compounds from sugar for fungal cultivation.

TABLE 12

Effects of different solvents on phenolic compounds and sugar extraction

| Solvent system | Solvent content (v/v) | Phenolics concentration (g/L) | Extracted phenolics content (mg tannic egv1/g) | Sugar concentration (g/L) | Extracted sugar content (g/g) | IC 50 (mg tannic eqv/L) |
|---|---|---|---|---|---|---|
| DI Water | 100% | 0.35 | 7.07 | 14.41 | 0.29 | 3.63 |
| Methanol | 100% | 0.65 | 13.06 | 11.36 | 0.23 | 2.41 |
| | 75% | 1.20 | 23.96 | 14.40 | 0.29 | 3.11 |
| | 50% | 1.22 | 24.44 | 15.04 | 0.30 | 2.85 |
| Ethanol | 100% | 0.14 | 2.87 | 4.33 | 0.09 | 2.92 |
| | 75% | 1.12 | 22.37 | 14.01 | 0.28 | 2.90 |
| | 50% | 1.50 | 29.92 | 16.06 | 0.32 | 2.20 |

1. eqv—equivalent

Example 5

Effects of Temperature and Time on Sugar Extraction from Almond Hulls

1) Experimental Design and Methods

The experimental design is listed in Table 13. 30 ml of DI water was added into a 50 ml falcon tube and preheated at 30° C. or 80° C. before mixing with almond hulls. Then ground almond hull powder was added to the falcon tube at three different TS loadings, including 5%, 10% and 15%. After soaking and incubating for different time, the falcon tube was centrifuged at 8000 rpm for 15 min, and the supernatant was collected for total reducing sugar assay.

Total reducing sugar concentration was measured.

TABLE 13

Experimental design

| Fixed parameters | Variables | Responses |
|---|---|---|
| DI water: 30 ml<br>Almond Hull | TS loading (w/w): 5%, 10% and 15%<br>Temperature: 30° C. and 80° C. | Total<br>reducing |

TABLE 13-continued

| Experimental design | | |
|---|---|---|
| Fixed parameters | Variables | Responses |
| size: <0.5 mm<br>Heating method:<br>water bath | Time:<br>2, 12, 24 and 36 h for 30° C.<br>1, 2, 3 and 36 h for 80° C. | sugar<br>concentration |

2) Results

Figure 3A:
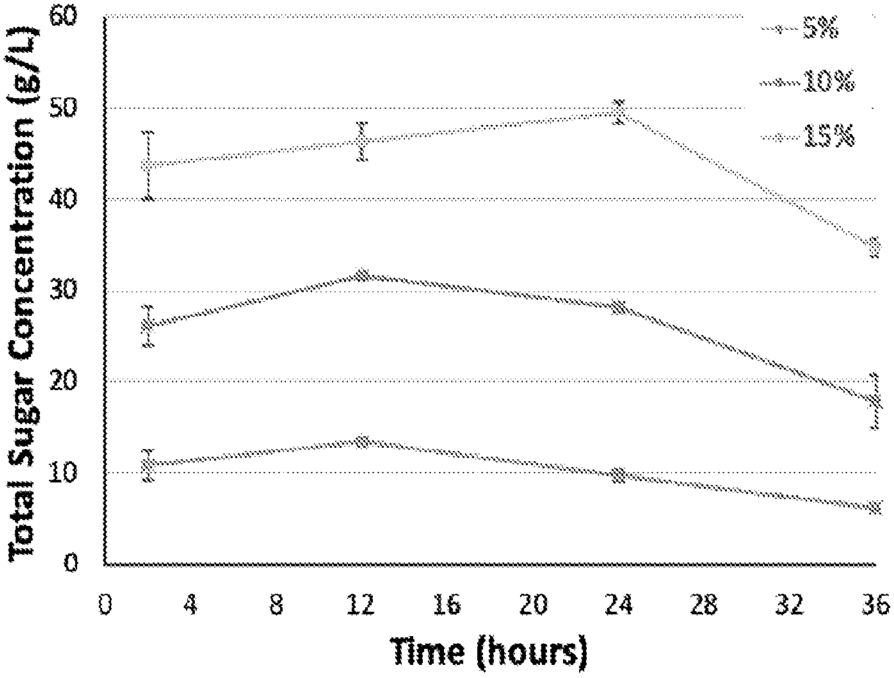
(FIG. 3A); Sugar extraction at 80° C.
Figure 3B:
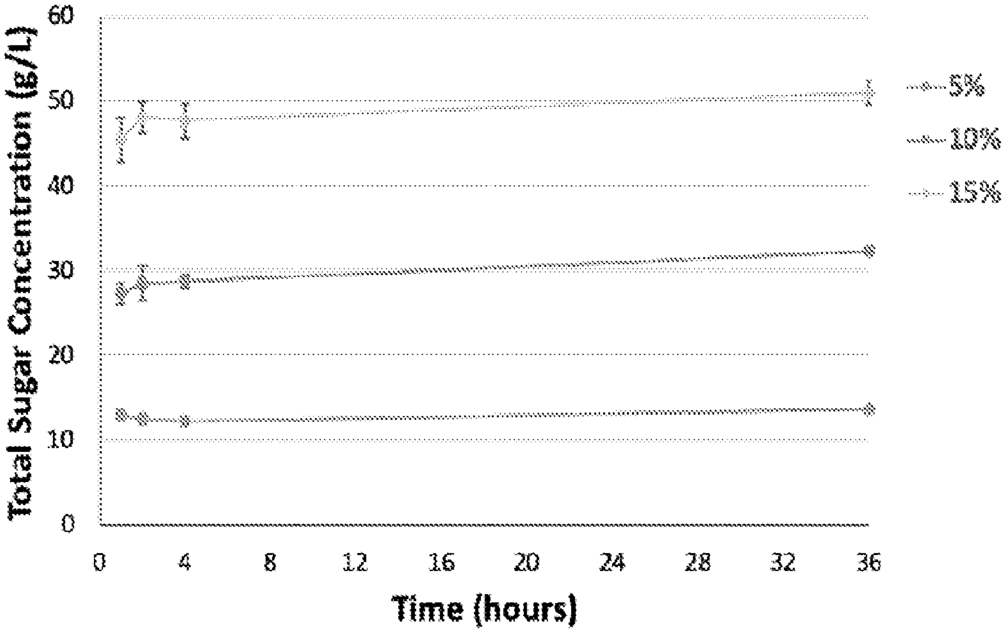
(FIG. 3B).

FIG. 3A and FIG. 3B shows the sugar concentration extracted at different temperature and TS loadings at different time. At 30° C. soluble sugars were totally dissolved within 12 h at 5% and 10% TS loading. For higher TS loading, 15%, 24 hours were needed to extract all the soluble sugars. However, at 80° C., soluble sugar was extracted much faster than at 30° C. All the soluble sugar was extracted within 2 hours at 5%, 10% and 15% loading.

All the sugar concentrations decreased finally at 30° C. while this didn't happen at 80° C. and even increase a little bit at 80° C. This might be caused by the sugar consumption by microbes in the almond hull liquid at 30° C. and 80+ C. prevented the sugar consumption by microbes.

Example 6

Comparison of Almond Hull Liquid with Two Commercial Media

1) Experimental Design and Methods

Before analyzing the fungal growth in almond hull, we compared some nutrients, including total Kjeldahl nitrogen (TKN), phosphate and sulfur, in almond hull liquid with two commercial media which were potato dextrose broth (PDB) and Czapek's media. Almond hull liquid was prepared by soaking 7% of almond hull at 80° C. for 2 h, which contained around 21.4 g/L sugar. According to preliminary experiments, 83.7% of the sugars in almond hull liquid could be utilized by *A. awamori*. So only 17.9 g/L sugar in the prepared almond hull liquid could be consumed by *A. awamori*. Both of the PDB and Czapek's media were prepared based on the same usable sugar concentration, which were 17.9 g/L.

We also compared the sugar consumption rate of *A. awamori* at these three different media by inoculating 4-day spores into the media at the level of $10^4$ spores/ml. The fungi were cultivated at 30° C. and 150 rpm for 12 days. 1 ml of liquid medium was collected every day for sugar analysis. The sugar analysis method is the same as Appendix A. Sugar concentration data were plotted against time and the sugar concentration in almond hull liquid was adjusted by usable sugar concentration. Then fungal growth was analyzed by the experiment designed in Table C-1. We also measured the composition of fungal biomass by sending samples to UC Davis Analytical Lab.

TABLE 14

| Experimental design | | |
|---|---|---|
| Fixed parameters | Variables | Responses |
| Usable sugar concentration: 17.9 g/L | Media: Almond hull liquid, PDB, Czapek | Sugar concentration<br>pH |

TABLE 14-continued

| Experimental design | | |
|---|---|---|
| Fixed parameters | Variables | Responses |
| Strain: *Aspergillus awamori*<br>Inoculum level: $10^4$ spores/ml<br>Cultivation conditions: 30° C., 150 rpm, 12 days | | Total Kjeldahl Nitrogen (TKN)<br>Phosphate<br>Sulfur<br>Protein<br>Crude fat<br>Acid detergent fiber<br>Neutral detergent fiber |

2) Results

Figure 4:
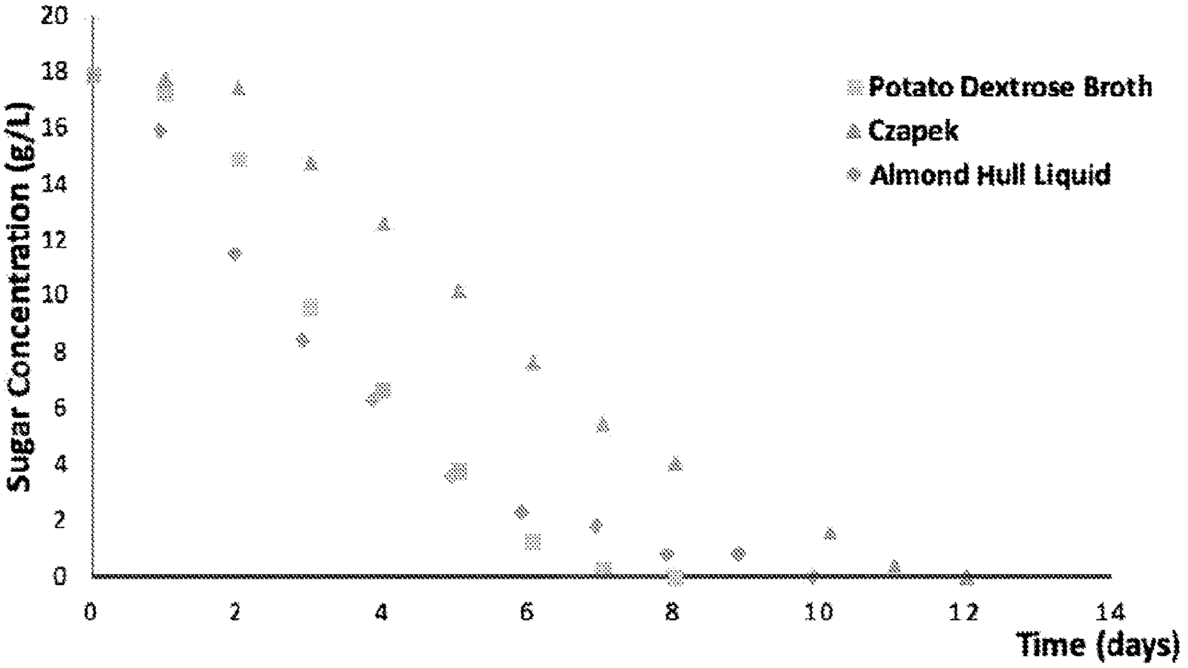
FIG. 4. Sugar consumption by *A. awamori* in different media.
Figure 5A:
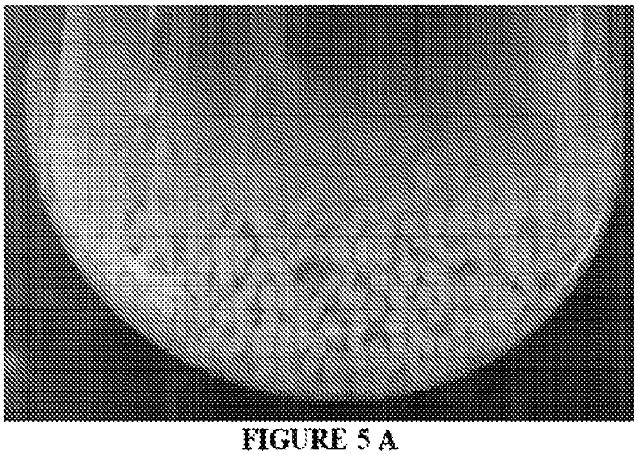
FIG. 5A almond hull liquid, FIG. 5B PDB, FIG. 5C Czapek's).
Figure 5B:
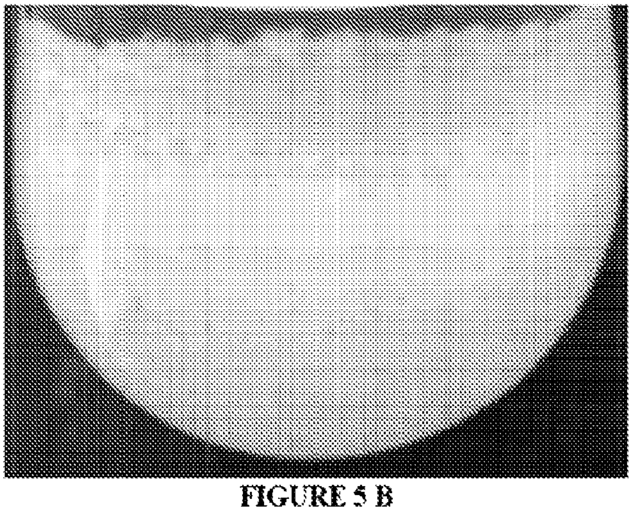
FIG. 5. *A. awamori* cultivated in different media.
Figure 5C:
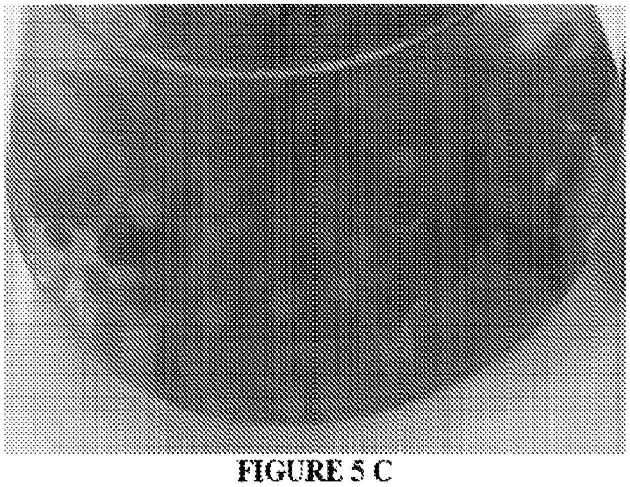

As listed in Table 15, almond hull liquid contained more nutrients than two commercial media based on the same sugar concentration. These nutrients favored the fungal growth and sugar consumption in almond hull liquid. FIG. 4 shows the sugar consumption rate by *A. awamori* in the three media. Sugar consumption rate were similar and comparable in PDB and almond hull liquid. The Czapek's media had the lowest sugar consumption rate. As shown in FIG. 5, we noticed that *A. awamori* could form uniform pellets in both PDB and almond hull liquid. But in Czapek's media, the fungal mycelium had various morphology including big clumps. These big clumps might bring some mass transfer problems and result in slow sugar consumption rate.

TABLE 15

Initial almond hull liquid, PDB and Czapek's media composition

| | pH | Usable sugar (g/L) | TKN (mg/L) | P (mg/L) | S (mg/L) |
|---|---|---|---|---|---|
| Almond hull liquid | 4.95 | 17.9 | 364 | 186.00 | 154.33 |
| PDB | 4.97 | 17.9 | 224 | 80.63 | 31.99 |
| Czapek's | 4.98 | 17.9 | 329 | 118.64 | 89.39 |

Based on the results above, we analyzed the fungal biomass composition cultivated in almond hull liquid and PDB after 4 days. The results are shown in Table 16. We found that fungal cultivated in almond hull liquid has higher protein content than in PDB, which were 23.8% and 17.5%, respectively.

TABLE 16

Comparison of *A. awamori* biomass composition (%. d.b.) cultivated in almond hull liquid and PDB.

| Media | Acid detergent fiber | Neutral detergent fiber | Protein | Fat |
|---|---|---|---|---|
| Almond hull liquid | 12.4 | 65.7 | 23.8 | 2.16 |
| PDB | 18.7 | 61.5 | 17.5 | 14.9 |

Example 7

Colorful Pellets Cultivation from Food Color

Fungal cultivation media potato dextrose broth (PDB) in six flasks were autoclaved at 121° C. for 30 min. Each flask had 120 ml PDB. Six different food color liquid were filtered through sterile 0.22 μm filters and then a drop of food color was added into each flask.

*Aspergillus awamori* (*A. awamori*) spores were transferred from a plate of potato dextrose agar to each flask at a level of $1*10^4$ spore/ml. The flasks were shaken at 150 rpm and incubated at 30° C. for 5 days. After 5 days, *A. awamori* grew into pellets and cheese cloth was applied to harvest fungal pellets. Fungal pellets harvested from each flask had the same color as the media (FIG. 12).

B. Colorful Pellets Cultivation from Fruits and Vegetable Color: Media Preparation Seven media from vegetables and fruits were prepared as follows: 1) Fresh blueberry, spinach, red beet and pomegranate peel were mixed with DI water at the mass ratio of 1:1 and then ground by food processor. After grinding, cheese cloth was applied to separate solid from liquid. 2) Matcha powder and ground coffee bought from supermarket were cooked by boiling water for few minutes. 3) Carrot juice was bought from supermarket. Suspended solids in all the liquid were removed by vacuum filtration with standard glass fiber filter paper to obtain a clear solution. Before fungal cultivation, spinach, pomegranate peel and red beet media were filtered through sterile filter with pore size of 0.22 μm to pasteurize the media. Pasteurization for the other four media, including carrot juice, blueberry, coffee and matcha media were accomplished by heating at 80° C. for 3 hours. 100 ml of each media mixed with 2 g glucose were transferred into sterile flask.

B.1. Fungal pellets preparation: Three flasks of precultured *A. awamori* pellets were prepared by inoculating spores into a commercial medium potato dextrose broth (PDB) at the level of $1*10^4$ spore/ml. The flasks were shaking at 150 rpm and incubated at 30° C. for 2 days.

B.2. Colorful pellets production: Precultured pellets from three flasks were mixed and transferred into 7 prepared media equally. Then these flasks were incubated at 30° C. and shaking at 150 rpm for three days. The harvested colorful are shown in FIG. 12 and FIG. 8.

Example 8

Shape, Color and Biological Stability

The fungal pellets described herein were analyzed for stability of shape, color, texture, and biological activity under storage conditions (refrigeration and freezing) and after heat treatment.

Shape Stability After Refrigeration Storage

Figure 13A:
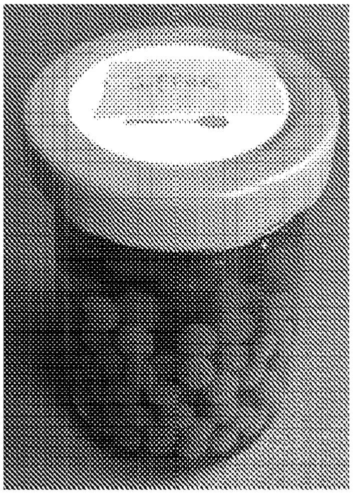
FIG. 13. Colored pellets with coffee extracts before storage (FIG. 13A) and after storage (FIG. 13B). Pellets colored with other extracts were also stable after storage (pomegranate pellets, FIG. 13C).
Figure 13B:
Figure 13C:
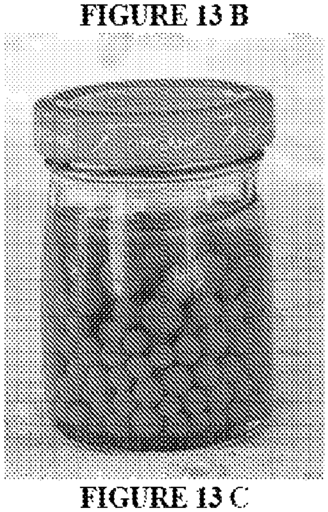

Precultured pellets were colored with extracts from coffee and pomegranate and stored in a refrigerator (~4° C.) for 70 days. The pellets showed no visible changes to shape or texture after storage (FIG. 13).

Conclusion: Fungal pellets retained their shape characteristics when stored for an extended period of time under refrigeration conditions.

Shape Stability After Frozen Storage

Figure 14A:
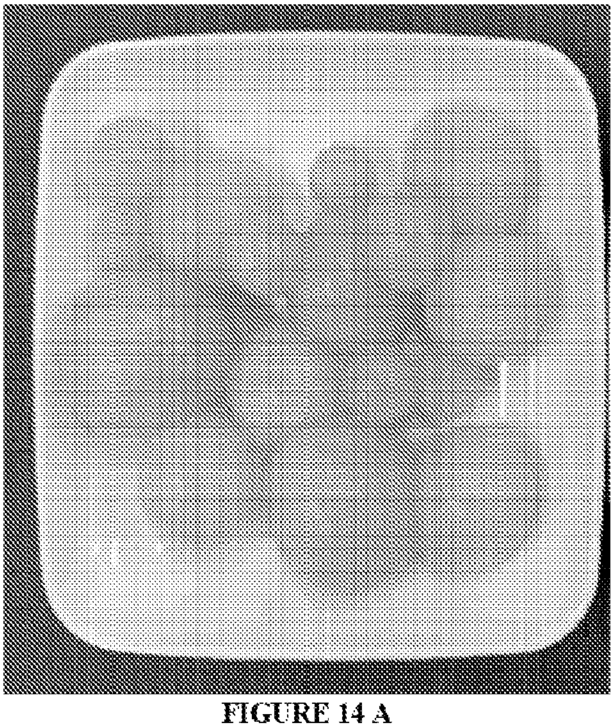
FIG. 14. "Bouncy" pellets after coating with agar and allowing regrowth for 3 days (A, harvested pellets before freezing; and B, pellets post-freezing and thawing).
Figure 14B:
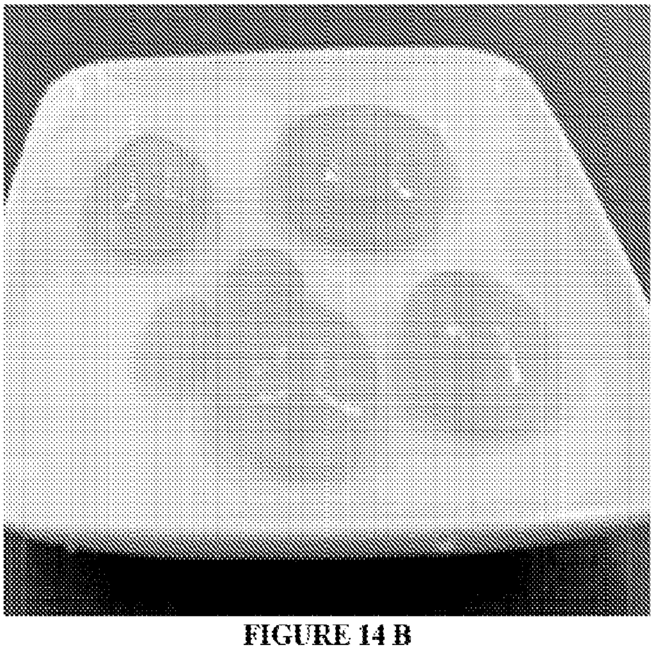

Precultured pellets were dipped in warm agar solution (32-54° C.) for 1-8 minutes and separated from agar solution after coating. These live pellets were then added to a new media to continue growth, resulting in a modified and "bouncier" texture throughout the pellets' layers. After 3 days, the pellets were harvested for a shape stabilization test (FIG. 14).

The shape stabilization test was done by freezing these pellets with or without DI water for 1 day. After 1 day, the frozen pellets were thawed and dipped into DI water to observe the stability of their shape. According to these tests, the pellets' shape can be retained while suspended in liquid and frozen, but they may lose some amount of the "bouncy" textural characteristic after thawing. Freezing the pellets with or without liquid suspension did not significantly affect the result.

Conclusion: Fungal pellets retained their shape characteristics when stored under frozen conditions but may lose an amount of textural characteristics.

Color Stability After Heat Treatment

Precultured pellets (grown in carrot or red beet extracts) were subjected to heat treatment of different temperatures (40-90° C.) for different holding times (2 min to 3 h). Color stability after heat treatment was assessed by visual observation. According to this test, the color of carrot pellets was very stable while the color of red beet pellets was more temperature sensitive (FIG. 15).

Conclusion: Colored fungal pellets can retain their color after certain heat treatment conditions. Different pigments are less stable under elevated temperatures than others. The heat treatment conditions can be optimized to retain color while delivering other characteristics such as reduced biological activity (see next section).

Biological Stability After Heat Treatment

Fungal mycelium is sensitive to environmental temperature. In order to produce probiotics or deactivated pellets, temperature and time are key parameters that need to be controlled during the production process.

Precultured pellets were heat treated in a water bath for different holding times (1 min to 2 h) and temperatures (40-90° C.). After heat treatment, pellets were transferred to potato dextrose agar (PDA) plates for 5 days to see if biological activity remained in the heat-treated pellets.

Conclusion: Temperatures of at least 55° C. for 3 min or 60° C. for 2 min were needed to deactivate the fungal pellets. The heat treatment conditions of temperature and time can be optimized depending on the desired material characteristics (such as color, texture, shape, etc.).

Example 9

Coated Fungal Pellets

*Aspergillus awamori* (ATCC 22342) was grown in culture as described in Example 1 and Example 2. Briefly, *Aspergillus awamori* was first cultivated in potato dextrose broth for 2 days. After two days, small pellets of approximately 1.5-3.5 mm were formed. The pellets were separated from the liquid media using cheese cloth.

Figure 16A:
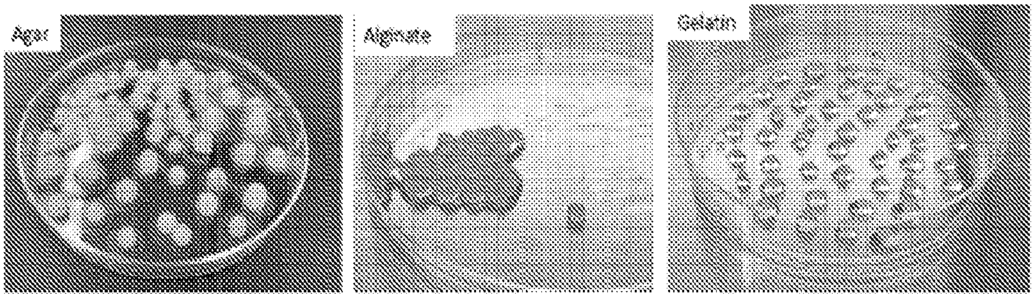
FIG. 16A. Photographs of *Aspergillus awamori* fungal pellets coated with agar, alginate and gelatin.
Figure 16B:
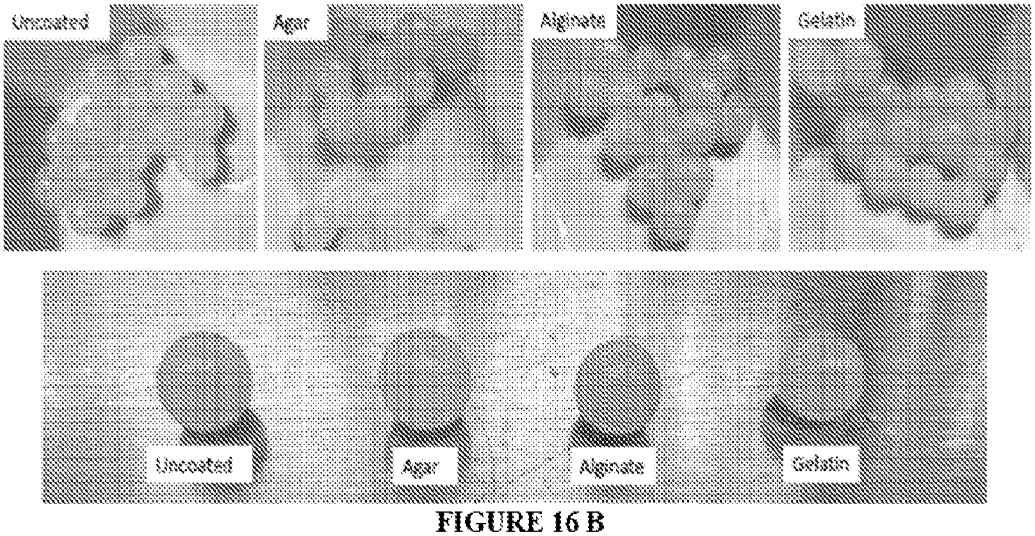
FIG. 16B. Photographs of uncoated (control) and *Aspergillus awamori* fungal pellets coated with agar, alginate and gelatin, and recultivated for 3 days (top) and close up photographs of single pellets (bottom).
Figure 17A:
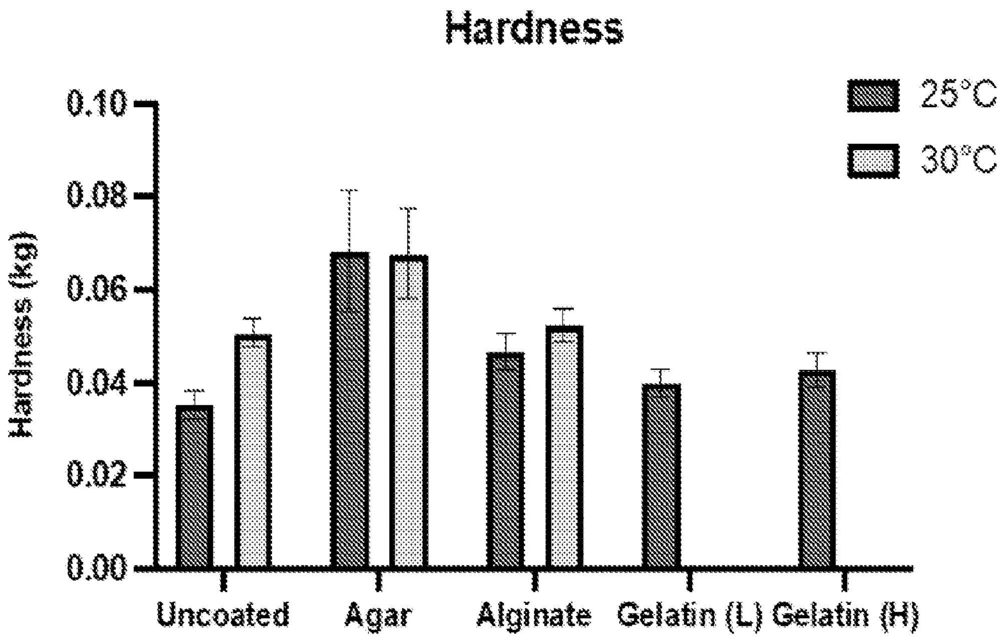
FIG. 17. Texture analysis of *Aspergillus awamori* fungal pellets uncoated (control) or coated with agar, alginate and gelatin and recultivated for 3 days at 25° C. or 30° C. Textures analyzed as shown in separate graphs: hardness, adhesiveness, chewiness, cohesiveness and springiness.
Figure 17B:
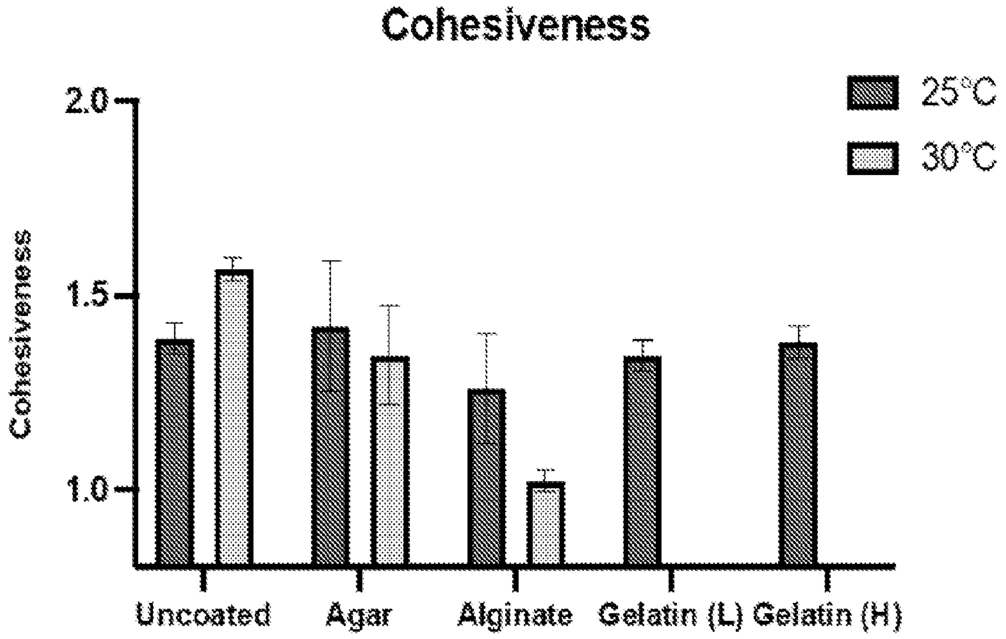
Figure 17C:
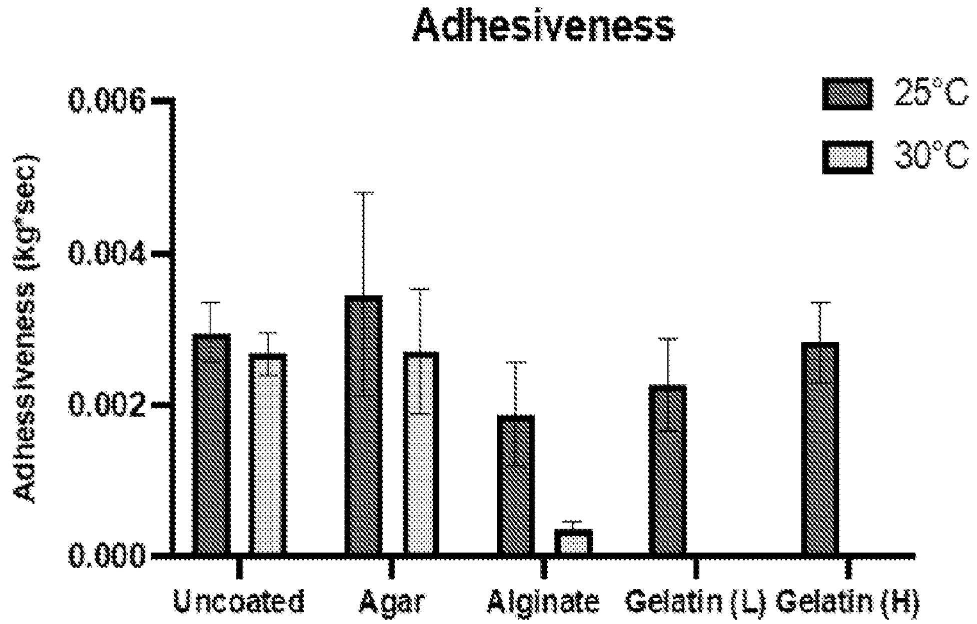
Figure 17D:
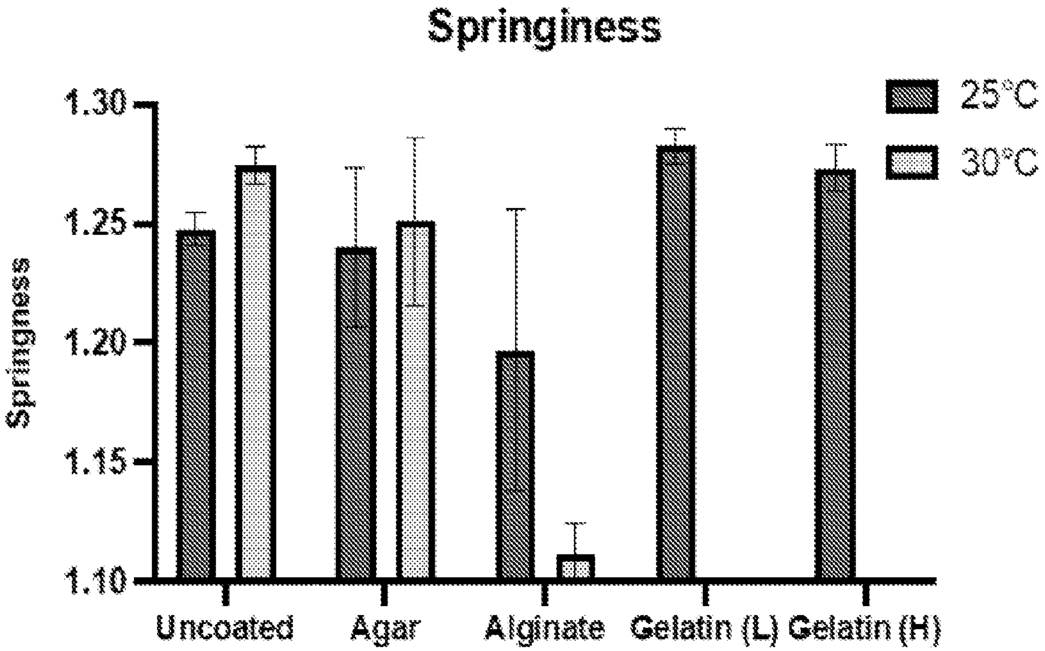
Figure 17E:
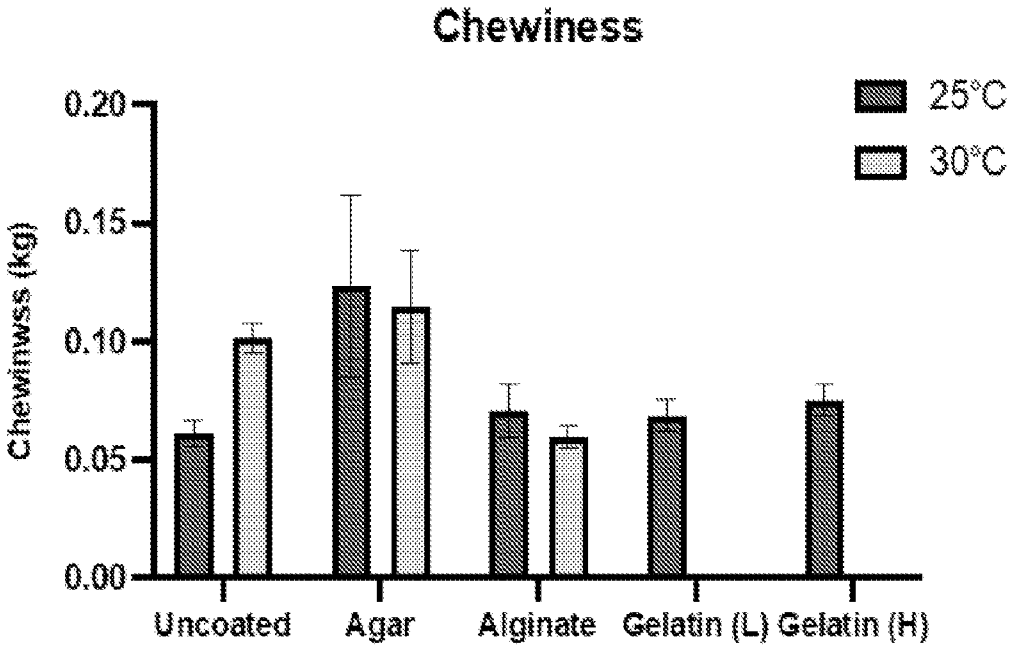

Approximately 45 pellets were placed into one of the sterilized solutions listed in Table 17, in warm conditions (50° C.) for 5 seconds, removed from the solution and then cooled to room temperature (25° C.). The coated pellets were then re-cultivated by placing the pellets into separate flasks containing 120 mL of sterilized potato dextrose broth and agitating at 150 rpm at the temperature indicated in Table 17 on a rotary shaker (Benchmark IncuShaker™ Mini, 19 mm orbit) for 3 more days. The pellets prior to re-cultivation are shown in FIG. 16A and after re-cultivation in FIG. 16B. Immediately after cultivation, analysis of textural characteristics of the pellets was performed.

TABLE 17

| Coating Materials and Conditions | | |
|---|---|---|
| Coating | Concentration of coating material | Re-cultivation temperature |
| control | NA | 25° C. |
| control | NA | 30° C. |
| Agar | 30 g/L | 25° C. |
| Agar | 30 g/L | 30° C. |
| Alginate | 0.5M CaCl2 + 30 g/L sodium alginate | 25° C. |
| Alginate | 0.5M CaCl2 + 30 g/L sodium alginate | 30° C. |
| Gelatin (L) | 30 g/L gelatin | 25° C. |
| Gelatin (H) | 50 g/L gelatin | 25° C. |

Texture Profile Analysis (TPA) of simple and coated pellets was performed using a Texture Analyzer (model TA.XT.Plus). The TPA was carried out with two compression cycles using a TA-4 probe. Trigger force was 5 g. Pretest, test and post-test speeds of the probe were 1 mm/s. One pellet was placed on the testing plate of the instrument and compressed to 50% of its initial height for both cycles. Twelve pellets from each preparation were tested.

Hardness, adhesiveness, springiness and chewiness were calculated from the force time curve obtained following the published methods of Wee et al., 2018. The two temperature conditions for recultivation generally resulted in the same texture profile for each of the coatings. The coated pellets exhibited increased gumminess, chewiness, hardness, and adhesiveness as compared to the uncoated controls. The coatings provided different textural characteristics from one another as shown in FIG. 17.

Example 10

Coated Fungal Pellets of Different Species

Figure 18:
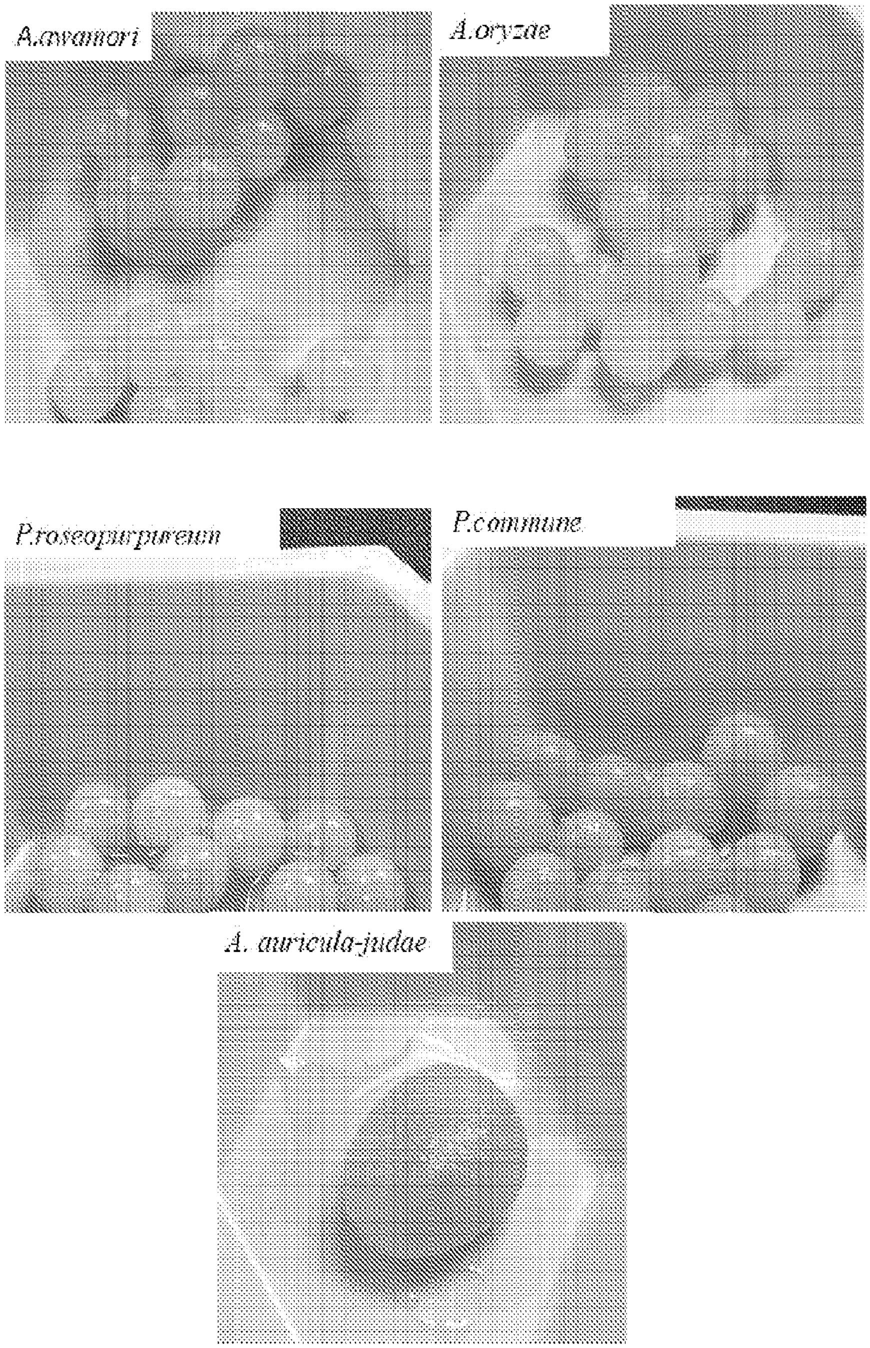
FIG. 18. Photographs of fungal pellets of *Aspergillus awamori, Aspergillus oryzae, Penicillium roseopurpureum* and *Penicillium commune* and *Auricularia auricula-judae*, coated with agar and recultivated for 3 days.
Figure 19A:
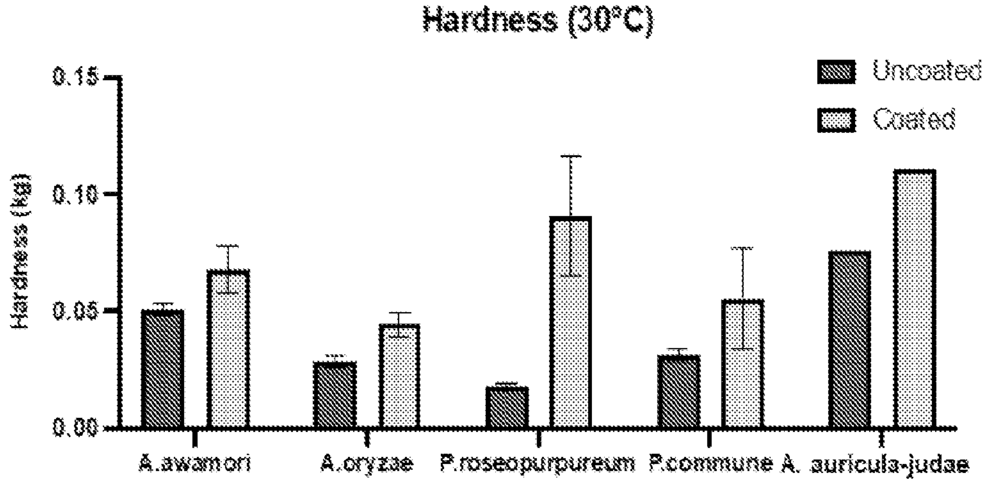
FIG. 19. Texture analysis of *Aspergillus awamori, Aspergillus oryzae, Penicillium roseopurpureum, Penicillium commune* and *Auricularia auricula-judae*, coated with agar and recultivated for 3 days. Textures analyzed as shown in separate graphs: hardness, adhesiveness, chewiness, and springiness FIG. 20. Texture analysis comparison for hardness, adhesiveness, chewiness, and cohesiveness characteristics of 1 layer pellets (*Aspergillus awamori* fungal pellets coated with agar and recultivated for 3 days) and 2 layer pellets (*Aspergillus awamori* fungal pellets coated with agar and recultivated for 3 days, followed by a second agar coating and additional recultivation for 3 days).
Figure 19B:
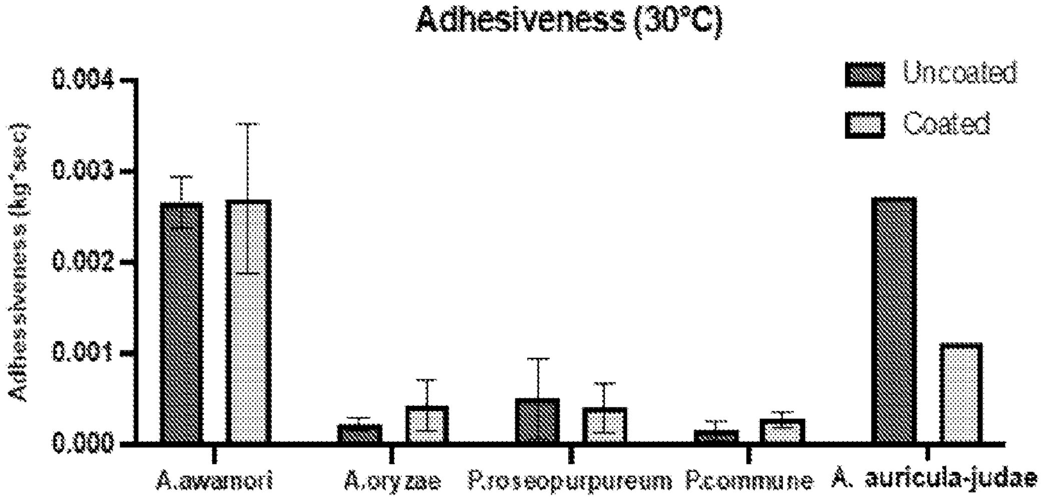
Figure 19C:
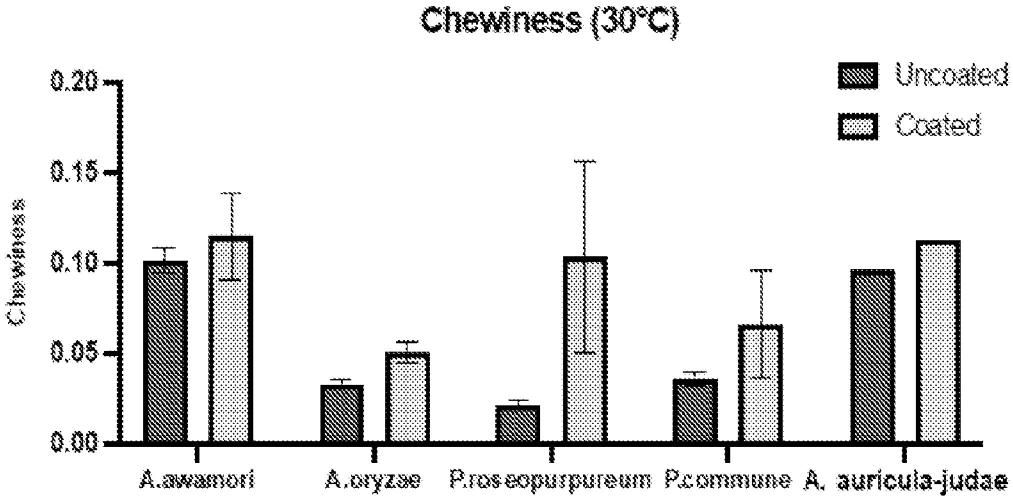
Figure 19D:
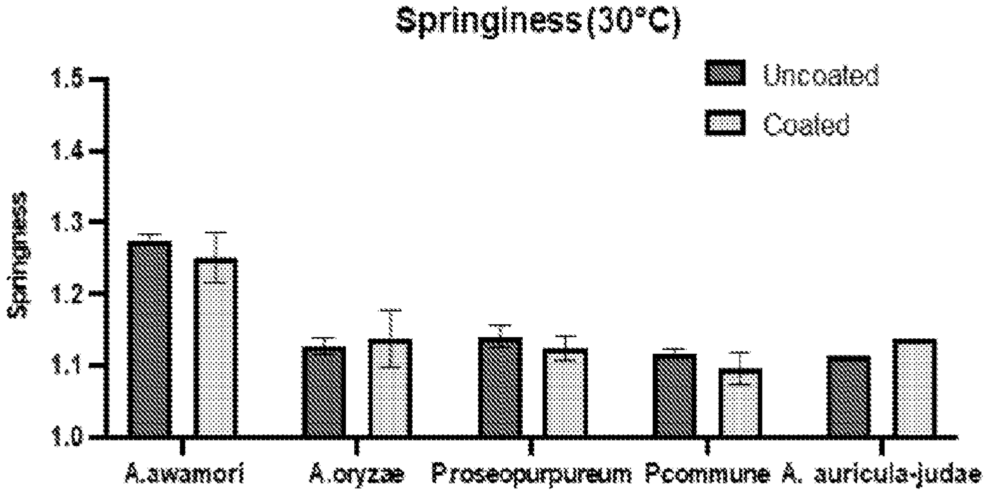

Each of 5 fungal species was grown in potato dextrose broth as described in Example 9 to form fungal pellets. Following initial pellet formation, each of the pellets was coated with agar (30 g/L) and recultivated at either 25° C. or 30° C. as described in Example 9. The five fungal species were *Aspergillus awamori, Aspergillus oryzae, Penicillium roseopurpureum, Penicillium commune* and *Auricularia auricula-judae*. FIG. 18 shows the pellets formed after recultivation with the five fungal species.

Texture Profile Analysis (TPA) was performed on the samples as described in Example 9. The results of the TPA are shown in FIG. 19. The results demonstrated that several fungal species may be used for the formation of fungal pellets. Coated pellets of these species provided additional texture characteristics.

Example 11

Comparison of One-Layer and Two-Layer Coatings

Figure 20A:
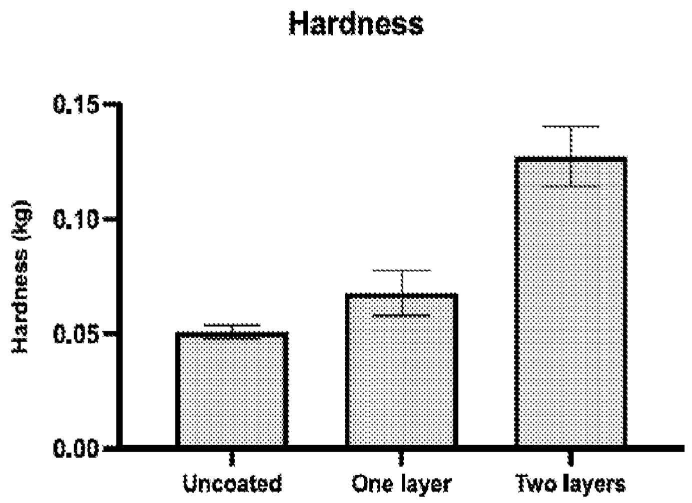
Figure 20B:
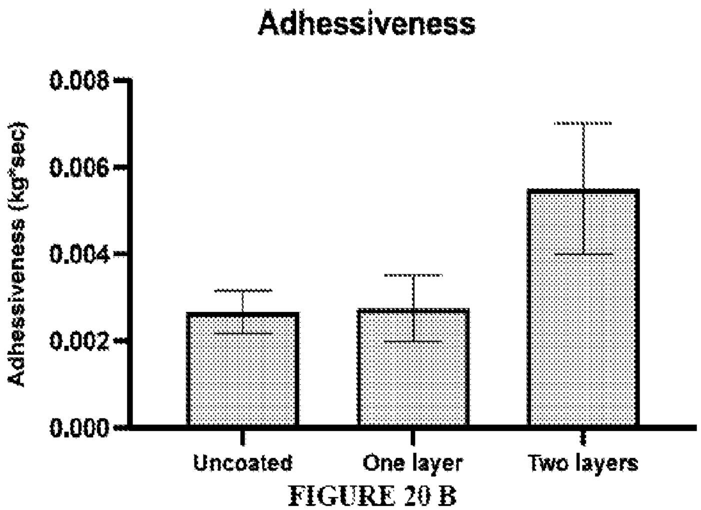
Figure 20C:
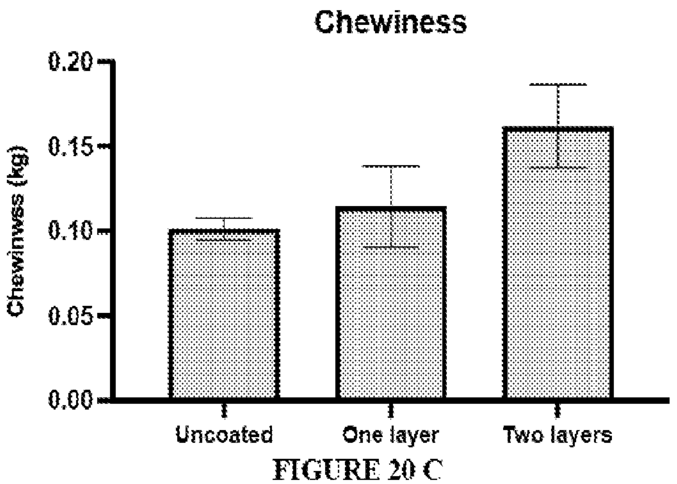

*Aspergillus awamori* was grown and the pellets were coated with agar as described in Example 9. After recultivation, these pellets were labeled "1 layered pellets." A subset of the 1 layered pellets was subjected to a second coating with agar (30 g/L) and then subjected to a second recultivation step by placing the pellets with the second coating into 120 mL of sterilized potato dextrose broth and agitating at 150 rpm on a rotary shaker (Benchmark Incu-Shaker™ Mini, 19 mm orbit) for 3 more days at 30° C. The resulting pellets were labeled "2 layered pellets." Texture analysis was performed as described in Example 10 on the 1 layered pellets and 2 layered pellets. Results are shown in FIG. 20. The 2 layered pellets exhibited increased gumminess, chewiness, hardness and adhesiveness as compared to the 1 layered pellets.

Example 12

Texture Stability After Refrigeration Storage

Figure 21:
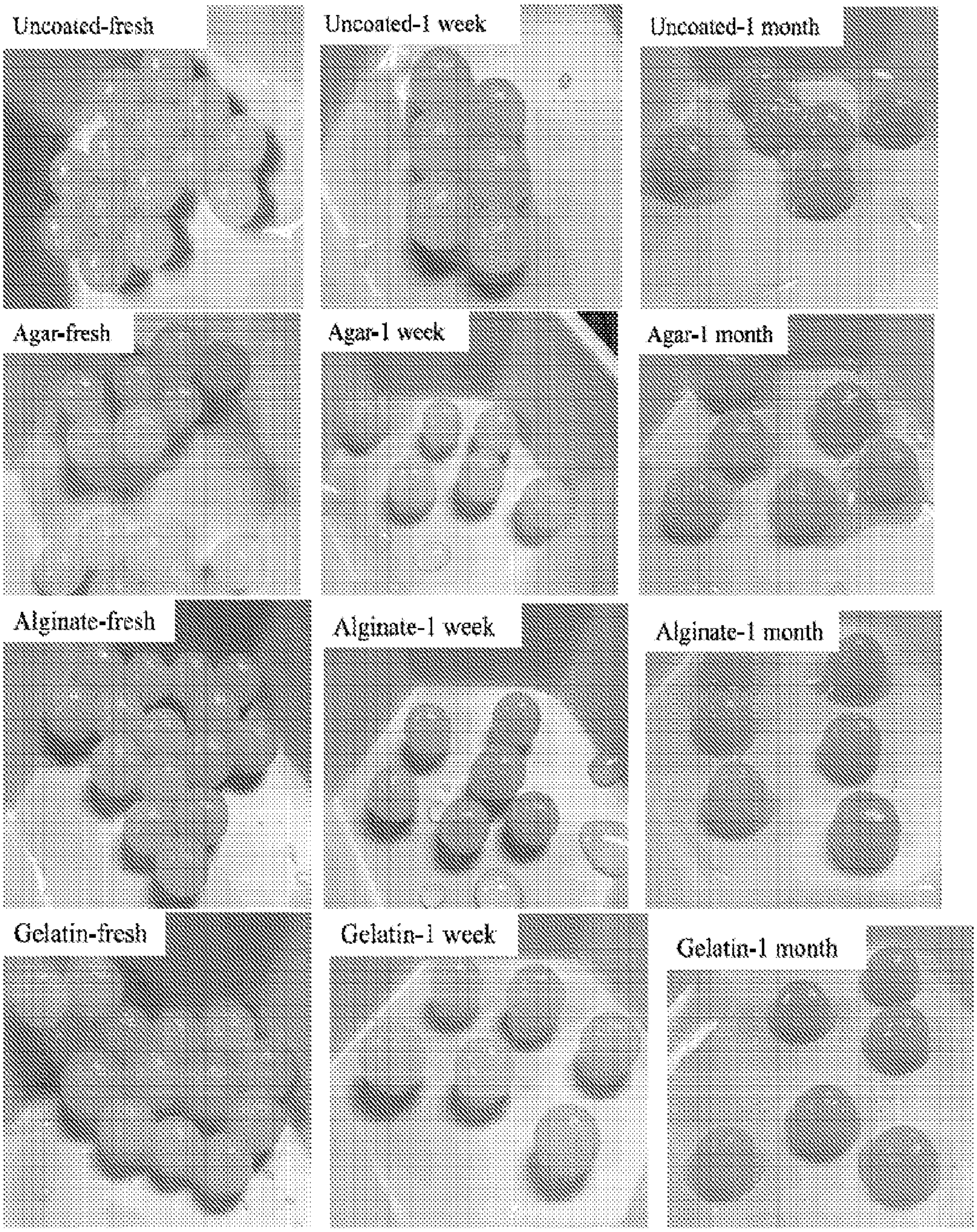
FIG. 21. Complexed and simple pellets of *A. awamori* before storage and after being stored at 4° C. for 1 week and 1 month.
Figure 22A:
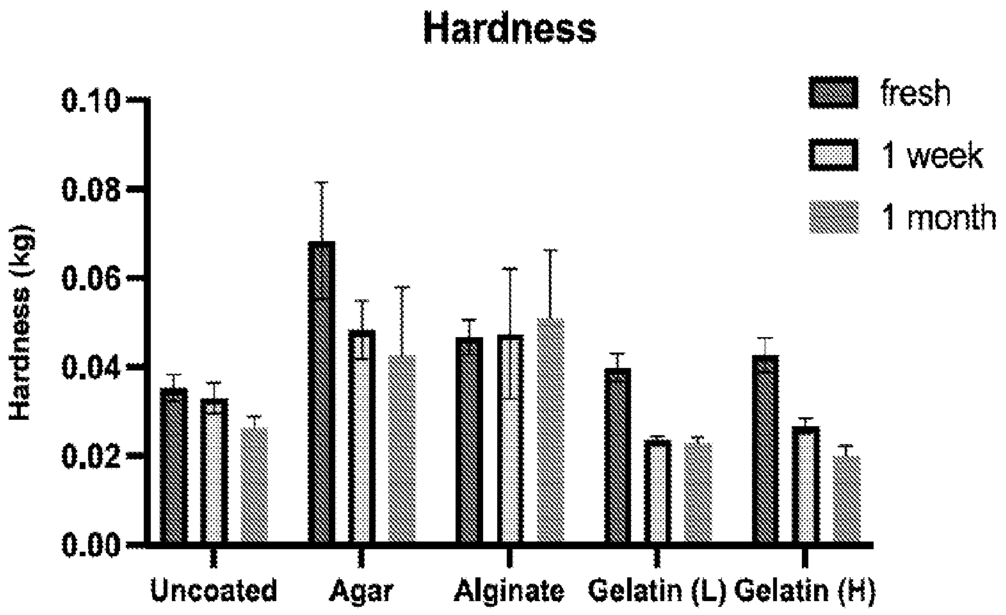
FIG. 22. Texture profile analysis of complexed and simple *A. awamori* pellets before and after being stored at 4° C. for 1 week and 1 month.
Figure 22B:
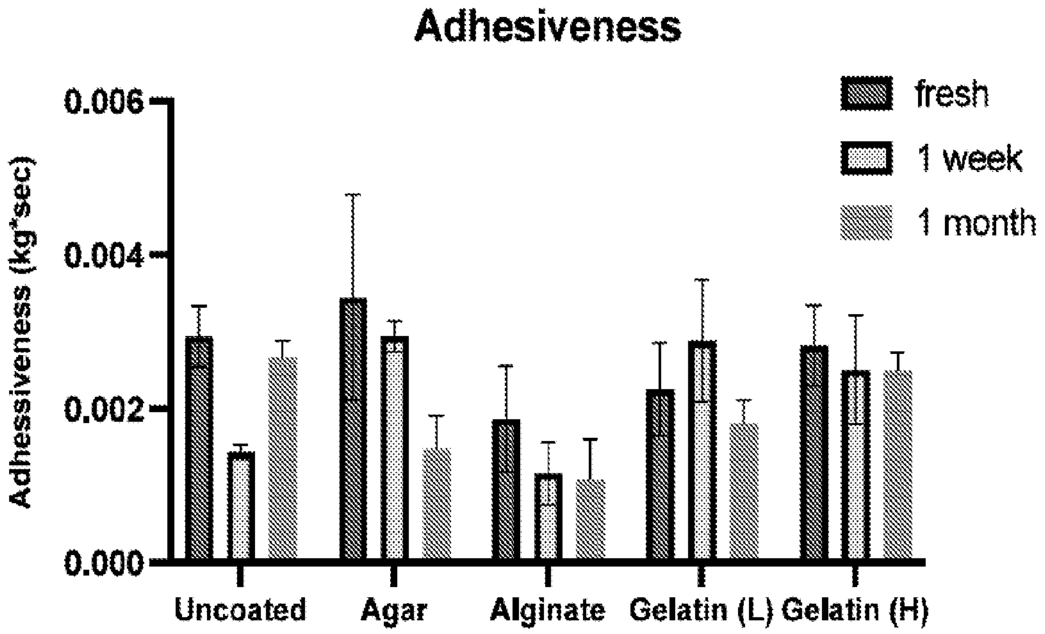
Figure 22C:
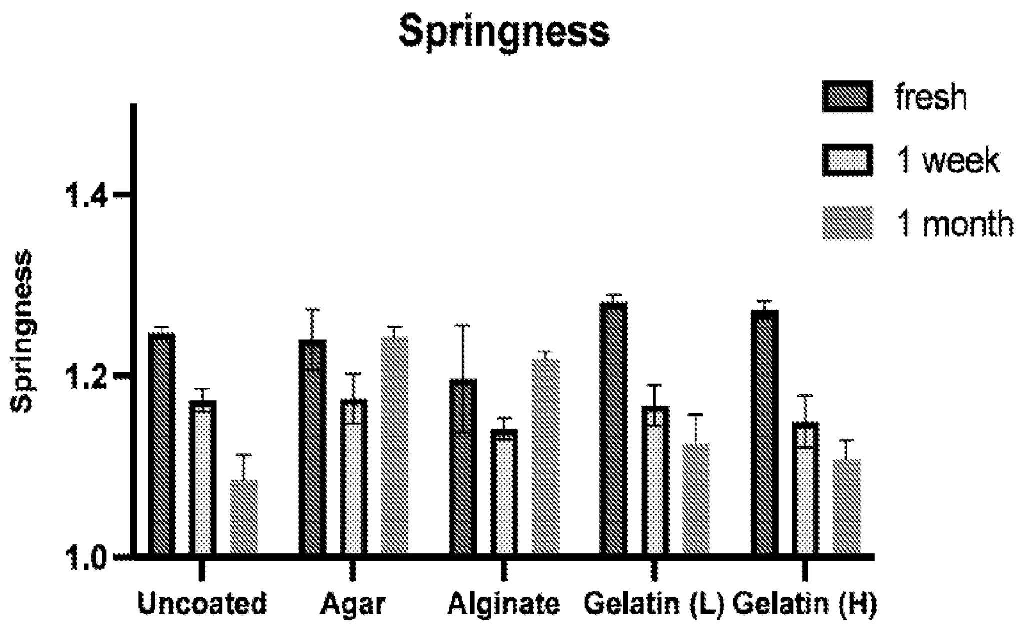
Figure 22D:
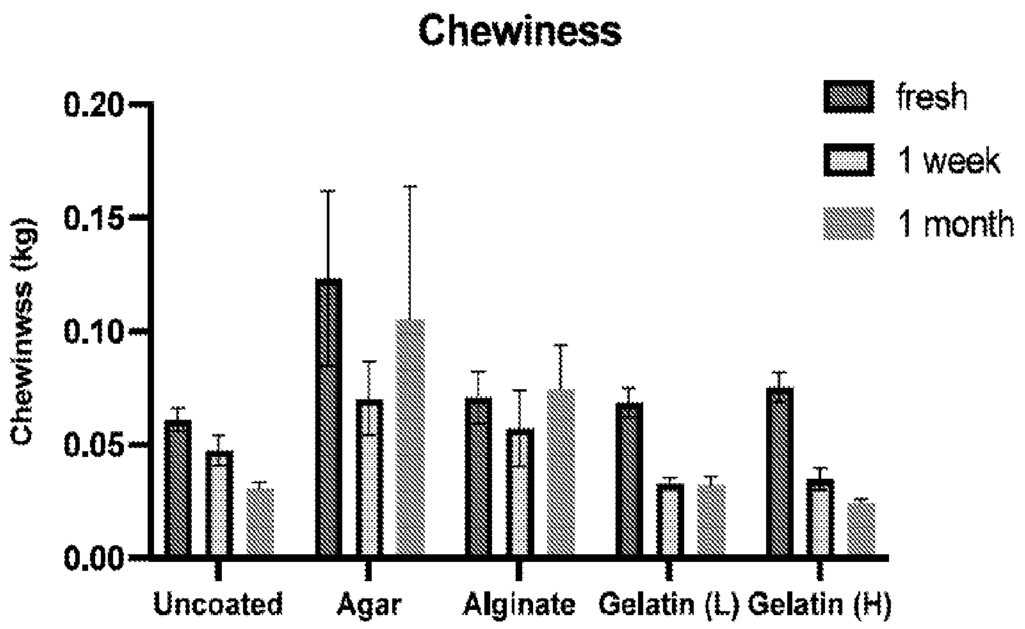

The coated pellets of *A. awamori* were stored in refrigerator (4° C.) with growth media (PDB). Texture profiles were analyzed after 1 week and 1 month as described previously. The fresh pellets and pellets stored in refrigerator for 1 week and 1 month are shown in FIG. 21. Hardness, adhesiveness, springiness, and chewiness are shown in FIG. 22. From these results, we found that the texture changed with storage time and complexed pellets displayed significantly better characteristics of hardness, adhesiveness, springiness and chewiness than simple pellets.

REFERENCES

1. Wee, May Sui Mei, et al. "Correlation of instrumental texture properties from textural profile analysis (TPA) with eating behaviours and macronutrient composition for a wide range of solid foods." *Food & function* 9.10 (2018): 5301-5312.
2. Berdahl, D. R. and McKeague, J. (2015). Rosemary and sage extracts as antioxidents for food preservation. In: Handbook of Antioxidants for Food Preservation (Shahidi, F., Ed.). Elseiver Ltd
3. Calixto, F. Saura, and J. Canellas. "Chemical composition of hulls of the sweet almond (Prunus amygdalus)." Journal of the Science of Food and Agriculture 33.4 (1982): 336-339.
4. Gracia, M. I., et al. "Alpha-amylase supplementation of broiler diets based on corn." Poultry Science 82.3 (2003): 436-442.
5. Moore, David, and Siu Wai Chiu. "Fungal products as food." Bio-exploitation of filamentous fungi. Fungal Diversity Press, Hong Kong (2001): 223-251.
6. Saleh, Ahmed A., et al. "*Aspergillus awamori* feeding modifies lipid metabolism in rats." BioMed research international 2013 (2013).
7. Saleh, A. A., et al. "Beneficial effects of *Aspergillus awamori* in broiler nutrition." World's Poultry Science Journal 70.4 (2014): 857-864.
8. Saleh, Ahmed A., et al. "Effects of feeding *Aspergillus awamori* and *Aspergillus niger* on growth performance and meat quality in broiler chickens." *The journal of poultry science* 48.3 (2011): 201-206.
9. Sang, S.; Lapsley, K.; Rosen, R. T.; and Ho, C. T. (2002). Shengmin, et al. New prenylated benzoic acid and other constituents from almond hulls (Prunus amygdalus Batsch). Journal of agricultural and food chemistry 50(3): 607-609.
10. Sfahlan, A. J.; Mohamoodzaden, A.; Hasanzadeh, A. Heidari, R.; and Jamei, R. (2009). Antioxidants and antiradicals in almond hull and shell (Amygdalus communis L.) as a function of genotype. Food Chemistry 115 (2): 529-533.
11. Takeoka, G.; Dao, L.; Teranishi, R.; Wong, R.; Flessa, S.; Harden, L.; and Edwards, R. (2000). Identification of three triterpenoids in almond hulls. Journal of Agriculture and Food Chemistry, 48: 3437-3439.

12. Winther, K.; Hansen, A. S.; and Campbell-Tofte, J. (2015). Bioactive ingredients of rose hips (Rosa canina L) with special reference to antioxidative and anti-inflammatory properties: in vitro studies. DOI https://doi.org/10.2147/BTAT.S91385

What is claimed is:

1. An edible composition comprising a pellet of an edible, cultured filamentous fungus selected from an active filamentous fungal culture and an inactivated filamentous fungal culture, and a first edible film, wherein the first edible film coats the pellet and, optionally a second edible film, wherein the second edible film coats the pellet and wherein the second edible film is exterior to the first edible film, wherein the filamentous fungus extends through the first edible film via fungal growth while the fungus in the pellet is an active culture, essentially completely coating the first edible film.

2. The edible composition of claim 1, wherein the filamentous fungus extends through the second edible film.

3. The edible composition according to claim 1, comprising at least three layers, wherein the inner-most layer comprises the filamentous fungus in pellet form, a middle layer comprises a first edible film and an outer layer comprises a second edible film, wherein the outer layer comprises the filamentous fungus.

4. The edible composition of claim 1, wherein the edible filamentous fungus is selected from *Aspergillus* sp., *Penicillium* sp., *Agaricus* sp., *Amanita* sp., *Armillaria* sp., *Auricularia, Boletus* sp., *Bovista, Calbovista* sp., *Calvatia* sp., *Cantharellus* sp., *Chlorophyllum* sp., *Clitocybe* sp., *Clitopilus* sp., *Coprinus* sp., *Cortinarius* sp., *Craterellus* sp., *Entoloma* sp., *Flammulina* sp., *Fusarium* sp., *Gomphus* sp., *Grifola* sp., *Polypilus* sp., *Gyromitra* sp., *Helvella* sp., *Hericium* sp., *Hydnum* sp., *Hygrophorus* sp., *Lactarius* sp., *Leccinum* sp., *Lentinus* sp., *Lepiota* sp., *Chlorophyllum* sp., *Lepiota* sp., *Lepista* sp., *Clitocybe* sp., *Lycoperdon* sp., *Marasmius* sp., *Morchella* sp., *Phlogiotis* sp., *Pholiota* sp., *Pleurocybella* sp., *Pleurotus* sp., *Pluteus* sp., *Polypilus* sp., *Grifola* sp., *Polyozellus* sp., *Polyporus* sp., *Ramaria* sp., *Rozites* sp., *Russula* sp., *Sparassis* sp., *Strobilomyces* sp., *Stropharia* sp., *Suillus* sp., *Terfezia* sp., *Tremella* sp., *Tricholoma* sp., *Tuber* sp., *Volvariella* sp., *Rhizopus* sp., and a combination thereof.

5. The edible composition of claim 1, wherein the edible filamentous fungus is an *Aspergillus* species selected from *Aspergillus oryzae, Aspergillus sojae, Aspergillus kawachii, Aspergillus shirousamii, Aspergillus awamori*, and a combination thereof.

6. The edible composition of claim 1, wherein the edible filamentous fungus is a *Penicillium* species selected from *Penicillium roseopurpureum, Penicillium, camemberti, Penicillium roqueforti, Penicillium chrysogenum, Penicillium roqueforti, Penicillium commune*, and a combination thereof.

7. The edible composition of claim 1, wherein a member selected from the first edible film, the second edible film and a combination thereof comprises an edible polymer independently selected from pullulan, alginate, cross-linked alginate, sodium alginate, propylene glycol alginate, pectin amylopectin, methoxyl pectin, inulin, carrageenan, cellulose gum, xanthan gum, locust bean gum, gellan gum, guar gum, tara gum, konjac gum, poly(styrenesulfonate), polyglutamic acid, alginic acid, poly(acrylic acid), poly(aspartic acid), poly(glutaric acid), dextransulfate, carboxymethylcellulose, modified carboxymethylcellulose, hyaluronic acid, chondroitin sulfate, heparin, methylcellulose, hydroxypropylmethyl cellulose, hydroxypropyl cellulose, polyvinyl pyrrolidone, maltodextrin, polydextrose, modified starch, tragacanth, gum acacia, modified gum acacia, xanthan gum alginate, agarose, gelatin, gelatin B, inulin, chitin, chitosan, and a combination thereof.

8. The edible composition of claim 1, wherein the pellet of the edible filamentous fungus, the first edible film, the second edible film, or any combination thereof comprises an added flavor component, a color component, a vitamin, a nutritional mineral, an amino acid, branched chain amino acid, or any combination thereof.

9. The edible composition of claim 1, wherein the inactivated filamentous fungal culture is heat inactivated.

10. The edible composition of claim 1, wherein the composition comprises 3 layers.

11. The edible composition of claim 3, wherein the composition comprises at least 4 layers, and wherein the outer layer is coated with one or more layers of a third edible film.

12. The edible composition of claim 11, wherein the third edible film comprises the same material as a member selected from the first edible film, the second edible film and a combination thereof.

13. The edible composition of claim 1, wherein the protein content of a member selected from the pellet and the composition is at least about 20%, 21%, 22%, 23%, 24%, 25%, 26%, 27%, 28%, 29%, 30%, 31%, 32%, 33%, 34%, 35%, 36%, 37%, 38%, 39%, or at least about 40%, or greater than about 40% wt/wt.

14. The edible composition of claim 1, wherein the sugar content of the composition is less than about 10 g, less than about 5 g, or less than about 2 g per 100 g of the composition.

15. The edible composition of claim 8, wherein the flavor component is a fruit flavor component and wherein the color component is a fruit color component.

16. A liquid composition comprising the edible composition of claim 1 formatted as a beverage comprising a member selected from alcohol, water, carbonated water, tea, milk, fruit juice, coffee, soda, or any combination thereof.

17. The liquid composition of claim 16, wherein the liquid composition is a boba-like beverage.

18. A method of preparing an edible composition comprising the steps of:

(a) culturing an edible filamentous fungi in a first nutrient medium for a first time period to start a growth of the edible filamentous fungi, whereby the edible filamentous fungi forms one or more pellets;

(b) contacting the one or more pellets with a first edible film, whereby the one or more pellets are coated with the first edible film to form one or more first edible film coated pellets, wherein at least one pellet or at least one edible film comprises a flavor component or a color component; and (c) submitting the pellet of (b) to a second culturing of the fungal pellet in a nutrient medium for a second time period such that the fungus grows and extends through the first edible film, essentially completely coating the first edible film.

19. The method of claim 18, further comprising the step of inactivating the growth of the edible filamentous fungus after (c).

20. An edible composition comprising a pellet of an edible, cultured filamentous fungus selected from an active filamentous fungal culture and an inactivated filamentous fungal culture, and a first edible film, wherein the first edible film coats the pellet and, optionally, a second edible film, wherein the second edible film coats the pellet and wherein the second edible film is exterior to the first edible film, wherein the filamentous fungus has extended through the first edible film via fungal growth occurring while the fungus in the pellet is an active culture, essentially completely coating the first edible film, and wherein at least one member selected from the pellet of the edible filamentous fungus, the first edible coating, the second edible coating and a combination thereof comprises an additive selected from a fruit flavor component, a fruit color component, and a combination thereof.

* * * * *